(12) United States Patent
Vantomme et al.

(10) Patent No.: US 10,053,522 B2
(45) Date of Patent: Aug. 21, 2018

(54) METALLOCENE-CATALYZED POLYETHYLENE

(75) Inventors: Aurélien Vantomme, Bois-d'Haine (BE); Pierre Bernard, Mont-sur-Marchienne (BE); Jacques Michel, Feluy (BE); Christopher Willocq, Bousval (BE); Armelle Sigwald, Table View (ZA)

(73) Assignee: Total Research & Technology Feluy, Seneffe (BE)

( * ) Notice: Subject to any disclaimer, the term of this patent is extended or adjusted under 35 U.S.C. 154(b) by 541 days.

(21) Appl. No.: 14/131,397

(22) PCT Filed: Jul. 6, 2012

(86) PCT No.: PCT/EP2012/063217
§ 371 (c)(1),
(2), (4) Date: Jan. 7, 2014

(87) PCT Pub. No.: WO2013/007619
PCT Pub. Date: Jan. 17, 2013

(65) Prior Publication Data
US 2014/0127427 A1 May 8, 2014

(30) Foreign Application Priority Data

Jul. 8, 2011 (EP) .................................. 11173375
Jul. 8, 2011 (EP) .................................. 11173376
(Continued)

(51) Int. Cl.
*C08F 4/76* (2006.01)
*C08F 4/52* (2006.01)
(Continued)

(52) U.S. Cl.
CPC ............... *C08F 4/76* (2013.01); *C08F 4/52* (2013.01); *C08L 23/0807* (2013.01); *E01C 13/08* (2013.01); *C08L 2205/02* (2013.01)

(58) Field of Classification Search
None
See application file for complete search history.

(56) References Cited

U.S. PATENT DOCUMENTS 5,008,204 A 4/1991 Stehling
7,081,285 B1 7/2006 Barre et al.
(Continued)

FOREIGN PATENT DOCUMENTS

CN 101084259 A 12/2007
EP 0881237 A1 12/1998
(Continued)

OTHER PUBLICATIONS

International Search Report issued in PCT/EP2012/063217 dated Oct. 8, 2012 (3 pages).
(Continued)

*Primary Examiner* — Ronak C Patel
(74) *Attorney, Agent, or Firm* — Albert Shung

(57) ABSTRACT

A metallocene-catalyzed polyethylene resin having a multimodal molecular weight and composition distribution, comprising from 45% by weight to 75% by weight of a low density fraction, said fraction having a density below or equal to 918 g/cm$^3$ as measured following the method of standard test ISO 1183 at a temperature of 23° C., wherein the density of the polyethylene resin is from 0.920 to 0.945 g/cm$^3$,
wherein the $M_w/M_n$ of the polyethylene is of from 2.8 to 6, wherein the melt index MI2 of the polyethylene resin of from 0.1 to 5 g/10 min measured following the method of standard test ISO 1133 Condition D at a temperature of 190° C. and under a load of 2.16 kg; and
(Continued)

wherein the composition distribution breadth index (CDBI) of the polyethylene resin is below 70%, as analyzed by quench TREF (temperature rising elution fractionation) analysis.

4 Claims, 3 Drawing Sheets

(30) Foreign Application Priority Data

| Oct. 10, 2011 | (EP) | .................................... | 11184553 |
|---|---|---|---|
| Oct. 10, 2011 | (EP) | .................................... | 11184554 |
| Jun. 8, 2012 | (EP) | .................................... | 12171379 |

(51) Int. Cl.
    *E01C 13/08*      (2006.01)
    *C08L 23/08*      (2006.01)

(56) References Cited

U.S. PATENT DOCUMENTS

| 2004/0044154 | A1 | 3/2004 | Kuo et al. |
|---|---|---|---|
| 2005/0159300 | A1 | 7/2005 | Jensen et al. |
| 2008/0188632 | A1 | 8/2008 | Razavi |
| 2008/0318015 | A1 | 12/2008 | Stephenne et al. |
| 2009/0156764 | A1* | 6/2009 | Malakoff ............... B29C 47/009 526/170 |
| 2010/0029883 | A1* | 2/2010 | Krajete ................. C08F 210/16 526/352 |
| 2010/0099824 | A1* | 4/2010 | Helland ..................... C08J 5/18 525/240 |
| 2010/0119793 | A1 | 5/2010 | Desjardins et al. |

FOREIGN PATENT DOCUMENTS

| EP | 1 674 504 A1 | 6/2006 |
|---|---|---|
| EP | 2 058 337 A1 | 5/2009 |
| WO | 93/03093 A1 | 2/1993 |
| WO | 2008/113680 A1 | 9/2008 |
| WO | 2008124557 A1 | 10/2008 |
| WO | WO 2009/037101 * | 3/2009 |
| WO | 2010084049 A1 | 7/2010 |
| WO | 2011073364 A1 | 6/2011 |

OTHER PUBLICATIONS

L. A. Utracki and B. Schlund "Linear Low Density Polyethylenes and Their Blends: Part 4 Shear Flow of LLDPE Blends With LLDPE and LDPE" Polymer Engineering and Science, vol. 27, No. 20, 1512 (1987).

L. Wild, et al. "Determination of Branching Distributions in Polyethylene and Ethylene Copolymers" Journal of Polymer Science: Polymer Physics Edition, vol. 20, 441(1982).

* cited by examiner

METALLOCENE-CATALYZED POLYETHYLENE

CROSS-REFERENCE TO RELATED APPLICATIONS

This application claims the benefit of PCT/EP2012/063217, filed on Jul. 6, 2012, which claims priority from EP 11173375.4, filed on Jul. 8, 2011, EP 11173376.2, filed on Jul. 8, 2011, EP 11184554.1, filed on Oct. 10, 2011, EP 11184553.3, filed on Oct. 10, 2011, and EP 12171379.6, filed on Jun. 8, 2012.

FIELD OF THE INVENTION

The present invention relates to a polyethylene resin with a preferably multimodal, more preferably bimodal, molecular weight and composition distribution. The present invention also relates to said polyethylene resin for the preparation of films.

BACKGROUND OF THE INVENTION

Polyethylene has been used in the production of various film products, such as bags and packaging. Examples of such products include shipping sack applications, fertilizer bags, insulation bags, food packaging, lamination film etc.

Biaxially-oriented, blown polyolefin films are generally known in the art and have been used in the production of articles such as garbage bags, shopping bags, food wraps, and any number of articles requiring polymer chain orientation in both the machine direction (MD) and the transverse direction (TD) of the film. Although cast films may be processed to achieve biaxial-orientation, blown films are generally preferred as they usually require less subsequent processing steps to achieve good mechanical properties. Desirable mechanical properties include dart impact, tear strength in both the machine and transverse directions, tensile strength in both the machine and transverse directions, elastic modulus, slow puncture resistance etc. Optical properties that are required namely transparency are measured under gloss and haze.

Tailoring the properties of polyolefins, such as polyethylene, to fit a desired applicability is constantly ongoing. In this case particularly, the objective is to have a better balance between mechanical and optical properties.

Metallocene catalyzed polyethylene having high and medium densities are known to have good optical properties. However, for film applications, they have mechanical properties which can still be improved, in particular dart impact, tear strength and slow puncture resistance. On the other hand, for example, polyethylene prepared with dual site catalysts in the gas phase or with Ziegler-Natta catalysts have good mechanical properties, but poorer optical properties. Nucleating agents are required to improve the gloss and haze. However, nucleating agents are not particularly effective for polyethylene resins. For example, for a haze of 30%, a nucleating agent cannot improve haze to less than 25%.

Achieving outstanding mechanical properties such as dart impact and/or slow puncture resistance and/or tear strength, as well as good optical properties such as haze and gloss, is an objective of the present invention.

Another objective is to also maintain good processability of the polyethylene resin compositions i.e. a high melt strength, to provide a polyethylene resin composition particularly suitable for film applications.

SUMMARY OF THE INVENTION

According to a first aspect, the present invention provides a metallocene-catalyzed polyethylene resin having a multimodal molecular weight distribution, comprising from 45% by weight to 75% by weight of a low density fraction, said fraction having a density below or equal to 918 g/cm$^3$ as measured following the method of standard test ISO 1183 at a temperature of 23° C.,
wherein the density of the polyethylene resin is from 0.920 to 0.945 g/cm$^3$,
wherein the $M_w/M_n$ of the polyethylene is of from 2.8 to 6,
wherein the melt index MI2 of the polyethylene resin of from 0.1 to 5 g/10 min measured following the method of standard test ISO 1133 Condition D at a temperature of 190° C. and under a load of 2.16 kg; and
wherein the composition distribution breadth index (CDBI) of the polyethylene resin is below 70%, as analyzed by quench TREF (temperature rising elution fractionation) analysis.

Preferably, the polyethylene resin comprises a fraction having a higher density than the low density fraction, wherein the ratio $M_w$ of the low density fraction/$M_w$ of the higher density fraction is less than 6 and greater than 2.5;

In a second aspect, the present invention also provides a film comprising the metallocene-catalyzed polyethylene resin according to the first aspect of the invention.

In a third aspect, the present invention also provides a process for preparing a metallocene-catalyzed polyethylene resin according to the first aspect of the invention, wherein said polyethylene resin is prepared in at least two reactors connected in series in the presence of a metallocene-containing catalyst system. Preferably the metallocene-containing system comprises a metallocene selected from a bridged bisindenyl metallocene or a bridged bis-tetrahydrogenated indenyl metallocene or a mixture of both.

In a fourth aspect, the present invention also provides a geo-membrane produced by flat sheet extrusion or by blown sheet extrusion comprising the metallocene-catalyzed polyethylene resin according to the first aspect of the invention.

In a fifth aspect, the present invention also provides an artificial grass tufted from slit film or monofilaments comprising the metallocene-catalyzed polyethylene resin according to the first aspect of the invention.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

DETAILED DESCRIPTION OF THE INVENTION

Figure 1:
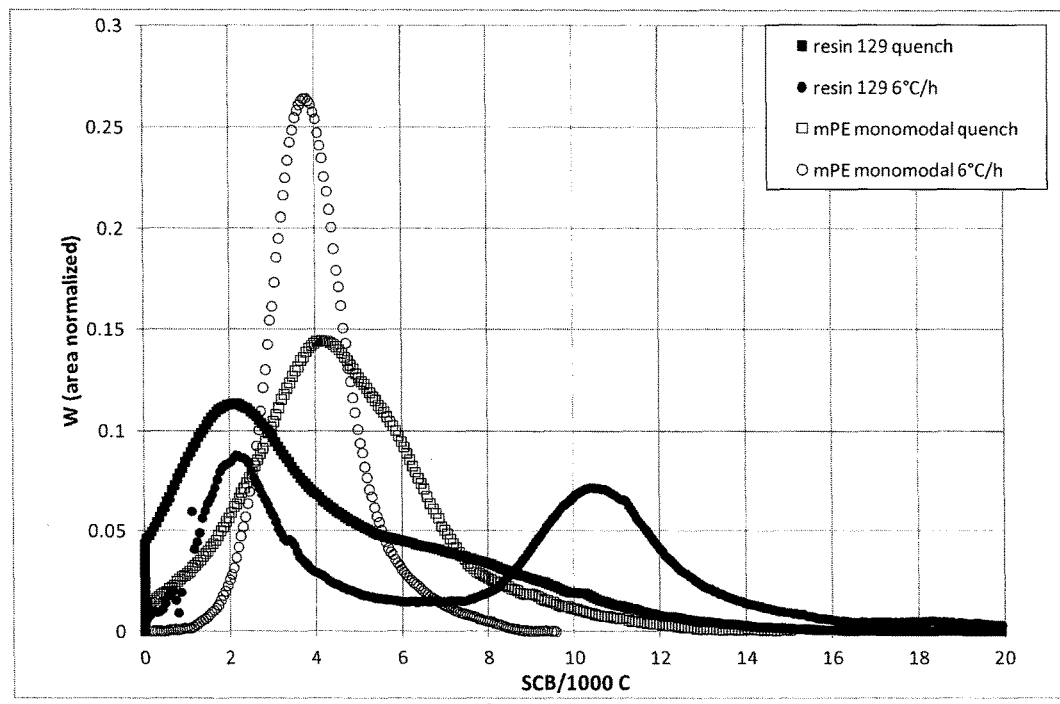
FIG. 1 represents a graph showing the Chemical Composition Distribution (CCD) curves obtained for resin 129 with two ATREF cooling conditions (quench, 6° C./h).

Before the present aspects of the invention are described, it is to be understood that this invention is not limited to particular materials, products, articles or processes described, since such may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise. By way of example, "a polyolefin" means one polyolefin or more than one polyolefin.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

All references cited in the present specification are hereby incorporated by reference in their entirety. In particular, the teachings of all references herein specifically referred to are incorporated by reference.

According to the first aspect of the invention a metallocene-catalyzed polyethylene resin is provided having a multimodal molecular weight and composition distribution, said metallocene-catalyzed polyethylene resin comprising from 45% by weight to 75% by weight of a low density fraction, said fraction having a density below or equal to 918 g/cm³, for example below or equal to 916 g/cm³, preferably below or equal to 915 g/cm³, preferably below or equal to 914 g/cm³ as measured following the method of standard test ISO 1183 at a temperature of 23° C.,
wherein the density of the polyethylene resin is from 0.920 to 0.945 g/cm³, preferably from 0.920 to 0.940 g/cm³, more preferably 0.920 to 0.936 g/cm³;
wherein the $M_w/M_n$ of the polyethylene is of from 2.8 to 6.0, preferably from 3.0 to 6.0, preferably from 3.0 to 5.0, preferably from 3.0 to 4.0, more preferably 3.5 to 4.0;
wherein the melt index MI2 of the polyethylene resin of from 0.1 to 5.0 g/10 min, preferably from 0.2 to 2.0 g/10 min; as measured following the method of standard test ISO 1133 Condition D at a temperature of 190° C. and under a load of 2.16 kg; and
wherein the composition distribution breadth index (CDBI) of the polyethylene resin is below 70%, as analyzed by quench TREF (temperature rising elution fractionation) analysis.

As used herein, the terms "metallocene-catalyzed polyethylene resin", "metallocene-catalyzed polyethylene" and "polyethylene resin composition" are synonymous and used interchangeably and refers to a polyethylene produced in the presence of a metallocene catalyst.

Preferably, the metallocene-catalyzed polyethylene resin comprises from 50% by weight to 75% by weight of the low density fraction, preferably from 55% to 75% by weight of the low density fraction, based on the total weight of the polyethylene resin.

In a preferred embodiment, the $M_w$ of the low density polyethylene fraction is from 80 to 180 kDa.

In a preferred embodiment, the CDBI of the low density polyethylene fraction is greater than 80%, preferably greater than 85%, more preferably greater than 90%, as analyzed by TREF under slow cooling conditions (cooling rate of 6° C./hour) (also referred herein as classical ATREF). The low density polyethylene fraction can be obtained from the metallocene-catalyzed polyethylene resin by fractionating the resin in two fractions with preparative TREF.

In an embodiment, the composition distribution breadth index (CDBI) of the polyethylene resin is below 70%, as analyzed by quench TREF analysis.

In an embodiment, the composition distribution breadth index (CDBI) of the polyethylene resin is of at least 30%, as analyzed by quench TREF analysis, preferably at least 35%.

In a preferred embodiment, the composition distribution broadness index (CDBI) of the polyethylene resin is below 70% and above 30%, as analyzed by quench TREF analysis.

In a preferred embodiment, the polyethylene resin comprises a fraction having a higher density than the low density fraction, wherein the ratio $M_w$ of the low density fraction/$M_w$ of the higher density fraction is less than 6.0 and greater than 2.5. For example, the ratio $M_w$ of the low density fraction/$M_w$ of the higher density fraction can be less than 6.0 and greater than 2.6, for example the ratio $M_w$ of the low density fraction/$M_w$ of the higher density fraction can be less than 5.50 and greater than 2.60, for example less than 5.30 and greater than 2.70.

Preferably, the metallocene-catalyzed polyethylene resin has a polydispersity index (PI) of at least 6.5, for example of at least 6.7, for example of at least 6.9, for example of at least 7.0.

Preferably, the metallocene-catalyzed polyethylene resin has a $g_{rheo}$ of less than 0.90, for example less than 0.85, for example less than 0.80, for example less than 0.75.

Preferably, the metallocene-catalyzed polyethylene resin has a $g_{rheo}$ of more than 0.35.

In an embodiment, the present invention also covers a polyethylene resin composition having:
a molecular weight distribution with an $M_w/M_n$ of from 2.8 to 6, preferably from 3 to 6; preferably the appearance of the molecular weight distribution curve exhibits the aspect of a monomodal distribution: one single peak and no shoulder visible in the distribution curve;
a density of from 0.920 to 0.945, for example 0.928 to 0.940 g/cm³ measured following the method of standard test ISO 1183 at a temperature of 23° C.;

suitable for preparing a film having
at least one, preferably two, more preferably all three, of the following mechanical properties:
- a dart impact (g/μm) as measured according to ISO 7765-1 at least equal to the value expressed by the equation below (equation expresses the observed increase of dart impact for the film according to the invention as density decrease);

$$Dart \geq 1.4 * \left[2.01 + \frac{22.9}{1 + e^{(d-0.91815)/0.004119}}\right];$$

wherein d is the density expressed in g/cm³ measured according to ISO 1183 at a temperature of 23° C.,
- an Elmendorf tear strength (N/mm) in the machine direction, measured according to ASTM D 1922, that is above or equal to the value expressed by the below equation (equation expresses tear in machine direction as a function of the density):

$$TearM \geq 1.3 * [(115/\pi) * (atan((d - 0.92736)/(-0.00453322)) + 0.5 * \pi)]$$

wherein d is the density expressed in g/cm³ measured according to ISO 1183 at a temperature of 23° C., and wherein the argument of a tan is expressed in radian;
- a slow puncture resistance of at least 65 J/mm measured according to ASTM D5748;

and at least one, preferably both, of the following optical properties:
- a gloss of at least 40% measured according to ASTM D-2457 at an angle of 45°;
- a haze of less than 20% measured according to ISO 14782;

wherein both mechanical and optical properties are measured on a 40 μm thick blown film prepared with said polyethylene resin composition using a blown film line equipment having a neck-in configuration with a extrusion screw diameter of 45 mm, a length to diameter ratio of the screw of 30, a die diameter of 120 mm, a blow-up ratio (BUR) of 2.5, a die gap of 1.4 mm, a frost line height of 320 mm, and cooling air at a temperature of 20° C.

The terms between brackets for the dart equation express the dart impact as function of density for monomodal metallocene-catalyzed polyethylene film grades. There is an at least 40% improvement with respect to monomodal compositions of metallocene-catalyzed polyethylene resins for the density range covered by the invention.

As way of example, for a density of 0.934 g/cm³, a dart impact strength can be at least 3.5 g/μm and at 0.930 g/cm³ dart impact strength can be above 4.5 g/μm measured according to ISO 7765-1.

For the Elmendorf tear strength, the expression between brackets in the equation describes the increase of tear strength in machine direction as function of density, compared to monomodal metallocene-catalyzed polyethylene resins. There is at least 35% improvement of Elmendorf tear strength for the resins according to the invention.

As way of example, for a density of 0.934 g/cm³, an Elmendorf tear strength in the machine direction is of at least 30 N/mm measured according to ASTM D 1922;

In one embodiment, the composition is suitable for preparing a film having:
- a dart impact strength (g/μm) of at least $$1.4 * \left[2.01 + \frac{22.9}{1 + e^{(d-0.91815)/0.004119}}\right],$$

and
- an Elmendorf tear strength (N/mm) in the machine direction of at least $$1.3 * [(115/\pi) * (atan((d - 0.92736)/(-0.00453322)) + 0.5 * \pi)],$$

and at least one, preferably both, of the following optical properties:
- a gloss of at least 40% measured according to ASTM D-2457 at an angle of 45°;
- a haze of less than 20% measured according to ISO 14782

In another embodiment, the composition is suitable for preparing a film having:
- a dart impact strength (Wpm) of at least $$1.4 * \left[2.01 + \frac{22.9}{1 + e^{(d-0.91815)/0.004119}}\right]$$

and
- a slow puncture resistance of at least 65 J/mm measured according to ASTM D5748.

and at least one, preferably both, of the following optical properties:
- a gloss of at least 40% measured according to ASTM D-2457 at an angle of 45°;
- a haze of less than 20% measured according to ISO 14782

In yet another embodiment, the composition is suitable for preparing a film having:
- an Elmendorf tear strength (N/mm) in the machine direction of at least $$1.3 * [(115/\pi) * (atan((d - 0.92736)/(-0.00453322)) + 0.5 * \pi)]$$

and
- a slow puncture resistance of at least 65 J/mm measured according to ASTM D5748.

and at least one, preferably both, of the following optical properties:
- a gloss of at least 40% measured according to ASTM D-2457 at an angle of 45°;
- a haze of less than 20% measured according to ISO 14782

Preferably, the composition has a melt index MI2 of from 0.1 to 5 g/10 min, measured following the method of standard test ISO 1133 condition D at a temperature of 190° C. More preferably, compositions for blown films have a MI2 of 0.2 to 3.8 g/10 min, preferably 0.2 to 3 g/10 min.

In an embodiment, the present invention also covers a process to prepare the polyethylene resin composition according to the invention comprising
- a polyethylene fraction A, at a weight percent of from 35 to 45 of the polyethylene resin composition, having a melt index of from 1.0 to 200 g/10 min and a density of from 0.920 to 0.965 g/cm³;

and a polyethylene fraction B, at a weight percent of from 45 to 75, preferably 55 to 65 of the polyethylene resin composition, having a melt index of from 0.01 to 1 g/10 min and a density of from 0.910 to 0.918 g/cm$^3$,
wherein each fraction is prepared in a different reactor of at least two reactors connected in series in the presence of a metallocene-containing catalyst system, preferably said metallocene-containing catalyst system comprising a metallocene selected from a bridged bisindenyl metallocene, a bridged bis-tetrahydrogenated indenyl metallocene or a mixture of both,
the polyethylene resin composition having a density of from 0.920 to 0.945 g/cm$^3$, for example from 0.928 to 0.940 g/cm$^3$, for example from 0.930 to 0.936 g/cm$^3$, measured following the method of standard test ISO 1183 at a temperature of 23° C., a molecular weight distribution with an $M_w/M_n$ of from 2.8 to 6, preferably from 3 to 6, and preferably, a melt index MI2 of from 0.1 to 5 g/10 min, preferably from 0.2 to 4 g/10 min, measured following the method of standard test ISO 1133 condition D at a temperature of 190° C.

The metallocene can be selected from formulas (I) and (II) below.

The invention covers in particular films prepared from this polyethylene resin composition.

Preferably, the polyethylene resin composition is a polyethylene resin composition having a bimodal molecular weight distribution i.e. consisting essentially of polyethylene fractions A and B.

Preferably, the metallocene comprises a bridged unsubstituted bis(tetrahydroindenyl), such as ethylene-bis(tetrahydroindenyl) zirconium dichloride and ethylene-bis(tetrahydroindenyl)zirconium difluoride.

Preferably, the two reactors in series are two loop reactors, more preferably two slurry loop reactors or two liquid full loop reactors i.e. a liquid full double loop reactor.

Preferably, polyethylene fraction A is produced in the first reactor and polyethylene fraction B is produced in the second reactor. Preferably, polyethylene fraction A is not degassed.

In an alternative embodiment, said polyethylene fraction B is produced in the first reactor and said polyethylene fraction A is produced in the second reactor. Preferably, polyethylene fraction B is degassed, such that fraction A produced in the second reactor is substantially free of comonomer, particularly for polyethylene densities of fraction A higher than 0.960 g/cm$^3$.

The same conditions and properties polyethylene resin composition apply to the process for producing that resin.

The present invention also encompasses a film comprising or consisting essentially of a metallocene-catalyzed polyethylene resin having a multimodal molecular weight distribution, said resin comprising from 45% by weight to 75% by weight of a low density fraction, said fraction having a density below or equal to 918 g/cm$^3$ as measured following the method of standard test ISO 1183 at a temperature of 23° C.,
wherein the density of the polyethylene resin is from 0.920 to 0.945 g/cm$^3$,
wherein the $M_w/M_n$ of the polyethylene is of from 2.8 to 6,
wherein the melt index MI2 of the polyethylene resin of from 0.1 to 5 g/10 min measured following the method of standard test ISO 1133 Condition D at a temperature of 190° C. and under a load of 2.16 kg; and
wherein the composition distribution breadth index (CDBI) of the polyethylene resin is below 70%, as analyzed by quench TREF (temperature rising elution fractionation) analysis.

In an embodiment, the invention also covers the film comprising or consisting essentially of the polyethylene resin composition wherein the film has
at least one, preferably two, most preferably all three, of the following mechanical properties:
a dart impact strength (g/μm) of at least $$1.4 * \left[2.01 + \frac{22.9}{1 + e^{(d-0.91815)/0.004119}}\right]$$

with dart being measured according to ISO 7765-1.
an Elmendorf tear strength (N/mm) in the machine direction of at least $$1.3 * [(115/\pi) * (atan((d - 0.92736)/(-0.00453322)) + 0.5 * \pi)]$$

tear strength being measured according to ASTM D 1922.
a slow puncture resistance of at least 65 J/mm measured according to ASTM D5748 and at least one, preferably both, of the following optical properties:
a gloss of at least 40% measured according to ASTM D-2457 at an angle of 45°;
a haze of less than 20% measured according to ISO 14782
wherein both mechanical and optical properties are measured on a 40 μm thick blown film prepared with said polyethylene resin composition using a blown film line equipment having a neck-in configuration with a extrusion screw diameter of 45 mm, a length to diameter ratio of the screw of 30, a die diameter of 120 mm, a blow-up ratio (BUR) of 2.5, a die gap of 1.4 mm, a frost line height of 320 mm, and cooling air at a temperature of 20° C.

In one embodiment, the film has:
a dart impact strength (g/μm) of at least $$1.4 * \left[2.01 + \frac{22.9}{1 + e^{(d-0.91815)/0.004119}}\right]$$

measured according to ISO 7765-1 and
an Elmendorf tear strength (N/mm) in the machine direction of at least $$1.3 * [(115/\pi) * (atan((d - 0.92736)/(-0.00453322)) + 0.5 * \pi)]$$

measured according to ASTM D 1922.
and at least one, preferably both, of the following optical properties:
a gloss of at least 40% measured according to ASTM D-2457 at an angle of 45°;
a haze of less than 20% measured according to ISO 14782
In another embodiment, the film can have:
a dart impact strength of at least $$1.4 * \left[2.01 + \frac{22.9}{1 + e^{(d-0.91815)/0.004119}}\right]$$

measured according to ISO 7765-1 and optionally
a slow puncture resistance of at least 65 J/mm measured according to ASTM D5748.
and at least one, preferably both, of the following optical properties:
a gloss of at least 40% measured according to ASTM D-2457 at an angle of 45°;
a haze of less than 20% measured according to ISO 14782
In yet another embodiment, the film has:
an Elmendorf tear strength (N/mm) in the machine direction of at least $$1.3*[(115/\pi)*(a\tan((d-0.92736)/(-0.00453322))+0.5*\pi)]$$

measured according to ASTM D 1922 and
a slow puncture resistance of at least 65 J/mm measured according to ASTM D5748.
and at least one, preferably both, of the following optical properties:
a gloss of at least 40% measured according to ASTM D-2457 at an angle of 45°;
a haze of less than 20% measured according to ISO 14782
The film can be a cast or blown film.
The invention also covers the process to prepare the films. The same conditions and properties apply as for the polyethylene resin composition.

Finally, the invention also encompasses the use of the polyethylene resin composition according to the invention to prepare films, in particular cast films and blown films.

The term "multimodal" refers to the "multimodal molecular weight distribution" of a polyethylene resin, having two or more distinct but possibly overlapping populations of polyethylene macromolecules each having different weight average molecular weights. A bimodal polyethylene will have two polyethylene fractions A and B. The bimodal polyethylene resin composition in this invention preferably has an "apparent monomodal" molecular weight distribution, which is a molecular weight distribution curve with a single peak and no shoulder. The polyethylene resin composition preferably obtained by blending at the polyethylene particle level wherein the different fractions of polyethylene can be obtained by operating two reactors under different polymerization conditions and transferring the first fraction to the second reactor i.e. the reactors are connected in series.

The two reactors can be operated under the comonomer/hydrogen split mode of "inverse" (also described herein as "reverse") configuration, wherein a first low molecular weight (high melt index), high density polyethylene fraction A is produced in the first reactor and a second high molecular weight (low melt index), low density polyethylene fraction B is produced in the second reactor. In this case, the first polyethylene fraction does not need to be degassed before being transferred to the second reactor. Polyethylene fraction A is preferably substantially free of comonomer, particularly for densities of fraction A of at least 0.960 g/cm³.

This is as opposed to the "direct" configuration, wherein the first high molecular weight, low density polyethylene fraction B is produced in the first reactor and the second low molecular weight, high density polyethylene fraction A is produced in the second reactor, in which case the first polyethylene fraction B is preferably degassed in order to substantially remove all unpolymerized comonomer and thus for said second fraction A to be substantially free of comonomer, particularly for densities of fraction A of at least 0.960 g/cm³.

The polyethylene resin composition according to the invention is prepared in the presence of a metallocene-containing catalyst system. The metallocene comprises a bridged bis-indenyl and/or a bridged bis-tetrahydrogenated indenyl catalyst component. The metallocene is selected from one of the following formula (I) or (II):

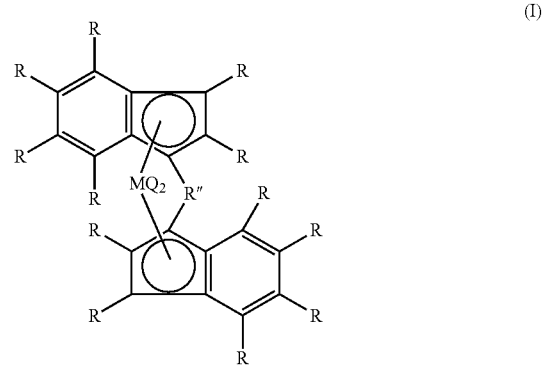

(I)

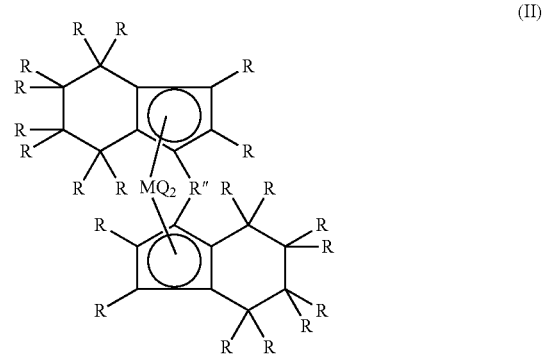

(II)

wherein each R is the same or different and is selected independently from hydrogen or XR'v in which X is chosen from Group 14 of the Periodic Table (preferably carbon), oxygen or nitrogen and each R' is the same or different and is chosen from hydrogen or a hydrocarbyl of from 1 to 20 carbon atoms and v+1 is the valence of X, preferably R is a hydrogen, methyl, ethyl, n-propyl, iso-propyl, n-butyl, tert-butyl group; R" is a structural bridge between the two indenyl or tetrahydrogenated indenyls to impart stereorigidity that comprises a $C_1$-$C_4$ alkylene radical, a dialkyl germanium, silicon or siloxane, or an alkyl phosphine or amine radical; Q is a hydrocarbyl radical having from 1 to 20 carbon atoms or a halogen, preferably Q is F, Cl or Br; and M is a transition metal Group 4 of the Periodic Table or vanadium.

Each indenyl or tetrahydro indenyl component may be substituted with R in the same way or differently from one another at one or more positions of either of the fused rings. Each substituent is independently chosen.

If the cyclopentadienyl ring is substituted, its substituent groups must not be so bulky so as to affect coordination of the olefin monomer to the metal M. Any substituents XR'v on the cyclopentadienyl ring are preferably methyl. More preferably, at least one and most preferably both cyclopentadienyl rings are unsubstituted.

In a particularly preferred embodiment, the metallocene comprises a bridged unsubstituted bis-indenyl and/or bis-tetrahydrogenated indenyl i.e. all R are hydrogens. More preferably, the metallocene comprises a bridged unsubstituted bis-tetrahydrogenated indenyl. Most preferably the metallocene is ethylene-bis(tetrahydroindenyl)zirconium dichloride or ethylene-bis(tetrahydroindenyl) zirconium difluoride.

The metallocenes impart on the polyethylene highly regular comonomer incorporation throughout all of the chain lengths, thus the comonomer distribution is quite narrow i.e. the composition distribution breadth index (CDBI) of the low density fraction is preferably above 50%, more preferably greater than 70%, preferably greater than 75%, yet more preferably greater than 80%. This can be measured by TREF analysis.

The active catalyst system used for polymerizing ethylene comprises the above-described catalyst component and a suitable activating agent having an ionizing action.

Suitable activating agents are well known in the art: they include aluminium alkyls aluminoxane or boron-based compounds. Preferably, the activating agent is selected from aluminium alkyls, more preferably from one or more of TIBAL, TEAL or TNOAL. Most preferably, the activating agent is TIBAL.

Optionally, the catalyst component can be supported on a support. Preferably the support is silica, a modified silica alumina or a modified silica, for example MAO-modified silica or a fluorinated silica support.

The polymerization of the metallocene-produced high density polyethylene can be carried out in gas, solution or slurry phase. Slurry polymerization is preferably used to prepare the polyethylene resin composition, preferably in a slurry loop reactor or a continuously stirred reactor. The polymerization temperature ranges from 20 to 125° C., preferably from 55 to 105° C., more preferably from 60 to 100° C. and most preferably from 65 to 98° C. and the pressure ranges from 0.1 to 10 MPa, preferably from 1 to 6 MPa, more preferably from 2 to 4.5 MPa, for a time ranging from 10 minutes to 6 hours, preferably from 1 to 3 hours, most preferably from 1 to 2.5 hours.

A double loop reactor is preferably used for conducting the polymerization. More preferably, the two reactors in series are preferably a slurry or liquid full double loop reactor wherein each loop is operated under different conditions in order to produce the polyethylene resin composition.

As described above, the double loop reactor can be operated in the "inverse" configuration or "direct" configuration.

In an embodiment, the low melt index, low density fraction (fraction B) has a density of at least 0.910 g/cm$^3$, preferably of at least 0.912 g/cm$^3$ and of at most 0.918 g/cm$^3$, more preferably of at most 0.916 g/cm$^3$, yet more preferably at most 0.914 g/cm$^3$. Most preferably it is of about 0.915 to 0.918 g/cm$^3$. Fraction B has a melt index MI of at least 0.01 g/10 min, preferably of at least 0.05 g/10 min, more preferably of at least 0.1 g/10 min and even more preferably of at least 0.2 g/10 min and of at most 1 g/10 min, more preferably of at most 0.8 g/10 min, even more preferably of at most 0.6 g/10 min. Most preferably, the MI is of 0.2 to 0.5 g/10 min. The polyethylene fraction B, is present at a weight percent of from 45 to 75, preferably of from 55 to 65 of the polyethylene resin composition, preferably of from 57 to 63, most preferably of from 58 to 62.

The density of the higher density fraction (A) is linked to that of the low density fraction (B) by the following expression:

$$d = W_A * d_A + (1 - W_A * d_B)$$

wherein $W_A$ is the weight fraction of fraction A, $d_A$ is the density of fraction A, $d_B$ is the density of fraction B, and wherein the sum of both fractions A and B by weight $(W_A + M_B)$ is 1.

In an embodiment the higher density fraction (A) has a low molecular weight.

In an embodiment, the high melt index, higher density fraction (fraction A) has a density of at least 0.920 g/cm$^3$, at least 0.927 g/cm$^3$, preferably at least 0.930 g/cm$^3$, for example at least 0.940 g/cm$^3$, more preferably of at least 0.942 g/cm$^3$, even more preferably of at least 0.945 g/cm$^3$ and of at most 0.965 g/cm$^3$, more preferably of at most 0.962 g/cm$^3$ and even more preferably of at most 0.960. Most preferably it is of about 0.927 to 0.958 g/cm$^3$. Fraction A has a melt index MI of at least 0.5 g/10 min, preferably of at least 0.8 g/10 min, more preferably of at least 1 g/10 min, even more preferably of at least 5 g/10 min and most preferably of at least 10 g/10 min and of at most 200 g/10 min, more preferably of at most 155 g/10 min, even more preferably of at most 100 g/10 min. Most preferably, the MI is of 0.8 to 100 g/10 min. The polyethylene fraction A, is present at a weight percent of from 35 to 45 of the polyethylene resin composition, preferably of from 37 to 43, most preferably of from 38 to 42.

The melt index and density of the fraction in the second reactor were determined using the following formula:

$$\text{Log MIfinal} = \text{wt \%1st} \times \text{Log MI1st} + \text{wt \%2nd} \times \text{Log MI2nd}$$

$$\text{density}_{final} = \text{wt \%}_{1st} \times \text{density}_{1st} + \text{wt \%}_{2nd} \times \text{density}_{2nd}$$

wherein
"final" means "of the polyethylene resin"
"1st" means "of the polyethylene fraction produced in the first reactor"
"2nd" means "of the polyethylene fraction produced in the second reactor, downstream of the first reactor"

The weight average molecular weight ($M_w$) of the second fraction (B) can be determined using the following formula:
$M_{w\,B} = (M_w - W_A * M_{wA})/(1 - W_A)$ based on the additive rule for blends of miscible polyethylene of similar molecular weight distribution (for example, in the present case, D ($M_w/M_n$) can be between 2.3 and 2.7), with $M_w$ being the $M_w$ of the final resin.

$$M_w = W_A * M_{wA} + (1 - W_A) * MW_B$$

This mixing rule is as described in L. A. Utracki and B. Schlund in Polym. Eng. Sci. 27, 1512 (1987)

The number average molecular weight $M_n$, of fraction B can be calculated from $M_{wB}$ by dividing its value by 2.6.

The polyethylene resin composition according to the invention has a density of from 0.920 to 0.945 g/cm$^3$, for example of from 0.928 to 0.940 g/cm$^3$, preferably 0.930 to 0.938 g/cm$^3$, more preferably 0.932 to 0.936 g/cm$^3$, most preferably 0.932 to 0.934 g/cm$^3$. The type and amount of comonomers used to prepare the copolymers useful with the invention will determine the density of the copolymer. Examples of comonomers that may be used to prepare the resin composition of the invention include alpha-olefins having from 3 to 12 carbon atoms, in particular propylene, butene, hexene and octene. Preferably hexene is used. One of ordinary skill in the art of preparing copolymers will know how to vary the monomer feed for any particular production unit to achieve a specified density.

The polyethylene resin composition preferably has a melt index MI2 of from 0.1 to 5, 0.1 to 4 g/10 min, preferably 0.2 to 4.0 g/10 min, yet more preferably 0.3 to 3.0 g/10 min following the method of standard test ISO 1133 condition D at a temperature of 190° C. These are ranges for polyethylene resin compositions particularly suitable for film applications.

More particularly, compositions for blown films have a MI2 of 0.1 to 4 g/10 min, most preferably 0.1 to 3.0 g/10 min. More preferably, compositions for cast films have a MI2 of 2.5 to 5 g/10 min, most preferably 2.5 to 4.0 g/10 min.

The polyethylene resin composition of the present invention preferably has a multimodal, preferably a bimodal molecular weight distribution, with an "apparent monomodal" molecular weight distribution, which is a molecular weight distribution curve with a single peak and no shoulder. The polyethylene resin composition has an enlarged molecular weight distribution curve due to the bimodal composition of molecular weight.

In a preferred embodiment, the polyethylene resin compositions of the present invention are bimodal in composition as measured by TREF analysis. TREF analysis can be performed as described in Wild et al. J. Poly. Sci., Poly. Phys. Ed. Vol. 20, (1982), 441 or U.S. Pat. No. 5,008,204). TREF profiles were obtained in analytical mode (ATREF) using two cooling conditions: quench and 6° C./h (classical ATREF). TREF was also operated in preparative mode (PTREF) to obtain the low density and the higher density fractions.

The TREF analysis can be performed with TREF instrument by Polymer ChAR (Valencia, Spain). TREF profiles can be obtained using following conditions: Quench ATREF (analytical TREF): dissolution in 1,2,4-trichlorobenzene (TCB) at 160° C. for 1 h, detector (DRI differential refractive index), injection of the solution in the ATREF column at about 30° C. heating rate of 2° C./min up to 130° C. concentration 0.05% w Classical ATREF: a solution of 0.05% w of polyethylene was prepared as described for the quench TREF at 160° C. and was injected on the ATREF column and allowed to slowly cool (at 6° C./h) from 100 to 30° C.

In order to calibrate the elution temperature with SCB (Short Chain Branching) (determined by NMR), samples of known SCB and narrow comonomer composition distribution (with CDBI >90%) were analyzed by TREF and this allowed to derive a calibration curve T elution-SCB. Using the cumulative distribution curve of eluted PE as function of SCB, we calculated CDBI (composition distribution breadth index) as taught in WO 93/03093 p. 18-19 and FIG. 17. A clear distinction between low density species (fraction with density <0.918 g/cm$^3$) and higher density species was seen with a marked bimodal character of the SCB distribution profile.

Preferably, the composition distribution breadth index (CDBI) of the polyethylene resin is below 70%, preferably below 68% as analyzed by quench TREF, and the CDBI of the low density polyethylene fraction is greater than 70%, preferably greater than 75%, more preferably greater than 80%, as analyzed by TREF.

The $M_w/M_n$ of the composition is of from 2.8 to 6, for example from 3 to 6, preferably 2.8 to 5.5, more preferably 2.9 to 5.0, most preferably 2.9 to 4.6, yet most preferably from 3.0 to 4.5.

Density is measured according to ISO 1183 at a temperature of 23° C.

The melt index MI2 and high load melt index HLMI are measured by the method of standard test ISO 1133 Condition D respectively under a load of 2.16 kg and 21.6 kg and at a temperature of 190° C. The molecular weight distribution is defined by the ratio $M_w/M_n$ of the weight average molecular weight $M_w$ to the number average molecular weight $M_n$ as determined by gel permeation chromatography (GPC).

The polyethylene resin composition according to the invention has particular rheological properties. The resins according to the invention exhibit an enhancement of zero-shear viscosity.

The enhancement of zero-shear viscosity is linked to $g_{rheo}$ that is a quantification of the amount of long chain branching (LCB) as probed by rheological techniques.

$g_{rheo}$ can be determined according to the disclosure in WO 2008/113680:

$$g_{rheo}(PE) = \frac{M_w(SEC)}{M_w(\eta_0, MWD, SCB)}$$

wherein $M_w$ (SEC) is the weight average molecular weight obtained from size exclusion chromatography expressed in kDa, as described above,
and wherein $M_w$ ($\eta_0$, MWD, SCB) is determined according to the following:

$M_w(\eta_0,MWD,SCB)=\exp(1.7789+0.199769 \text{ Ln } M_n+0.209026(\text{Ln } \eta_0)+0.955(\ln \rho)-0.007561(\text{Ln } M_z)(\text{Ln } \eta_0)+0.02355(\ln M_z)^2)$ Density ρ is measured in g/cm$^3$ and measured according to ISO 1183 at a temperature of 23° C.

Zero shear viscosity $\eta_0$ in Pa·s is obtained from a frequency sweep experiment combined with a creep experiment, in order to extend the frequency range to values down to $10^{-4}$ s$^{-1}$ or lower, and taking the usual assumption of equivalence of angular frequency (rad/s) and shear rate. Zero shear viscosity $\eta_0$ is estimated by fitting with Carreau-Yasuda flow curve (η–W) at a temperature of 190° C., obtained by oscillatory shear rheology on ARES-G2 equipment (manufactured by TA Instruments) in the linear viscoelasticity domain. Circular frequency (W in rad/s) varies from 0.05-0.1 rad/s to 250-500 rad/s, typically 0.1 to 250 rad/s, and the shear strain is typically 10%. In practice, the creep experiment is carried out at a temperature of 190° C. under nitrogen atmosphere with a stress level such that after 1200 s the total strain is less than 20%. The apparatus used is an AR-G2 manufactured by TA instruments.

PI (Polydispersity Index) determined by rheological methods provides a second measurement of molecular weight polydispersity Polydispersity Index (PI) was determined at a temperature of 190° C. by using parallel plates rheometer model ARES-G2 marketed by TA instrument (USA), operating at an oscillation frequency which increases from 0.1 rad/sec to about 300 rad/sec. From the crossover modulus one can derive the PI by way of the equation: P.I.=$10^6$/Gc in which Gc is the crossover modulus which is defined as the value (expressed in Pa) at which G'=G" wherein G is the storage modulus and G" is the loss modulus.

The polyethylene resin compositions according to the invention also have good processability and high melt strength.

Melt strength increases as MI2 decreases and as $g_{rheo}$ decreases. In an embodiment, the polyethylene resins of the invention have a $g_{rheo}$ below 0.9, and have higher melt strength than other bimodal resins with $g_{rheo}$ close to 1 (linear PE). Enhanced processability of the resins of the invention can also be identified by high SR ratio (HLMI/MI2) that reflects the increased shear thinning behavior of the present resins. Both high PI and low $g_{rheo}$ values contribute to an enhanced shear thinning behavior. This processability may also be measured for the resins of the invention, in part, by their ability to be processed at relatively comparable extrusion pressures at comparable MI2 value, despite their higher molecular weight. Desirably the polyethylene resin compositions exhibit sufficient melt strength to enable processing at the applicable extrusion pressures.

The polyethylene resin composition of the present invention may contain additives, in particular additives suitable for injection stretch blow moulding, such as, by way of example, processing aids, mould-release agents, anti-slip agents, primary and secondary antioxidants, light stabilizers, anti-UV agents, acid scavengers, flame retardants, fillers, nanocomposites, lubricants, antistatic additives, nucleating/clarifying agents, antibacterial agents, plastisizers, colorants/pigments/dyes and mixtures thereof. Illustrative pigments or colorants include titanium dioxide, carbon black, cobalt aluminum oxides such as cobalt blue, and chromium oxides such as chromium oxide green. Pigments such as ultramarine blue, phthalocyanine blue and iron oxide red are also suitable. Specific examples of additives include lubricants and mould-release agents such as calcium stearate, zinc stearate, SHT, antioxidants such as Irgafos 168™, Irganox 1010™, and Irganox 1076™, anti-slip agents such as erucamide, light stabilizers such as tinuvin 622™ and tinuvin 326™, and nucleating agents such as Milliken HPN20E™.

Film Applications

The polyethylene resin composition according to the invention is particularly suitable for film applications i.e. to prepare films. In particular, it provides a good balance in both mechanical and optical properties. In comparison with commercial grades, the mechanical properties are just as good, if not better, with the added advantage that the films obtained using this metallocene-catalyzed polyethylene are particularly transparent i.e. low haze.

The present invention therefore also encompasses a film comprising the metallocene-catalyzed polyethylene resin according to the first aspect of the invention.

The present invention therefore also relates to a film comprising a metallocene-catalyzed polyethylene resin, said resin having a multimodal molecular weight distribution,
  wherein said resin comprises from 45% by weight to 75% by weight of a low density fraction, said fraction having a density below or equal to 918 g/cm$^3$ as measured following the method of standard test ISO 1183 at a temperature of 23° C.;
  wherein the density of the polyethylene resin is from 0.920 to 0.945 g/cm$^3$;
  wherein the $M_w/M_n$ of the polyethylene is of from 2.8 to 6;
  wherein the melt index MI2 of the polyethylene resin of from 0.1 to 5 g/10 min as measured following the method of standard test ISO 1133 Condition D at a temperature of 190° C. and under a load of 2.16 kg; and
  wherein the composition distribution breadth index (CDBI) of the polyethylene resin is below 70%, as analyzed by quench TREF (temperature rising elution fractionation) analysis.

In particular, the films according to the invention have preferably an excellent Dart impact strength/resistance and/or excellent tear strength both in the machine and optionally transverse directions and/or excellent resistance to slow puncture, whilst also having very good optical properties, namely haze and/or gloss.

In an embodiment, said film has a dart impact strength (g/µm) as measured according to ISO 7765-1 which is at least equal to the value expressed by the equation below $$\text{Dart} \geq 1.4 * \left[2.01 + \frac{22.9}{1 + e^{(d-0.91815)/0.004119}}\right];$$

wherein d is the density expressed in g/cm$^3$ as measured following the method of standard test ISO 1183 at a temperature of 23° C.

Preferably, the film has a dart impact strength of at least $$1.3 * [(115/\pi) * (a\tan((d-0.92736)/(-0.00453322)) + 0.5 * \pi)]$$

for densities d between 0.920 and 0.945 g/cm$^3$. For example, for resin having a density of 0.930 g/cm$^3$, the film can have a dart impact strength of a value of at least 4.5 g/µm measured according to ISO 7765-1, for example a dart impact strength of at least 4.75 g/µm, preferably at least 5 g/µm, more preferably at least 5.5 g/µm.

In an embodiment, said film has an Elmendorf tear strength in the machine direction (N/mm) as measured according to ASTM D 1922 that is above or equal to the value expressed by following equation:

$$\text{TearM} \geq 1.3 * [(115/\pi) * (a\tan((d-0.92736)/(-0.00453322)) + 0.5 * \pi)],$$

wherein d is the density in g/cm$^3$, as measured following the method of standard test ISO 1183 at a temperature of 23° C., and wherein the argument of a tan is expressed in radian.

Preferably, the film has an Elmendorf tear strength in the machine direction of at least $$1.3 * [(115/\pi) * (a\tan((d-0.92736)/(-0.00453322)) + 0.5 * \pi)]$$

for densities between 0.920 and 0.945 g/cm$^3$. For example, for a resin having a density of 0.930 g/cm$^3$, the film can have an Elmendorf tear strength in the machine direction of at least 38 N/mm, preferably of at least 40 N/mm, measured according to ASTM D 1922.

In an embodiment, the film has a slow puncture resistance of at least 65 J/mm measured according to ASTM D5748, more preferably a slow puncture resistance of at least 70 J/mm, most preferably at least 75 J/mm.

In an embodiment, the film has a gloss of at least 40% measured according to ASTM D-2457 at an angle of 45°, more preferably a gloss of at least 45%, preferably at least 50%.

In an embodiment, the film has a haze of less than 20% measured according to ISO 14782, more preferably a haze of less than 19%, preferably less than 17%, more preferably less than 16%.

Examples of articles and products that may desirably be prepared using the polyethylene resin compositions may include blown films and cast films. Blown films may include, for example, films used as geoliners, i.e., in-ground liners used to prevent contamination of surrounding soil and groundwater by materials found in, and leaching from, for example, trash collection and chemical dump sites. Other blown film applications include apparel bags and/or coverings, bread bags, produce bags and the like. The polyethylene resin compositions may be used in a wide variety of thicknesses and as one or more layers of a multi-layer film construction. In other embodiments they may be used as coatings or may, as films, be coated or subjected to fluorination or other treatments to increase their barrier potential for these and other uses. The films are also suitable for use in or as articles designed for packaging in particular food packaging, construction, insulation, and as laminating films etc.

Any known film blowing line equipment can be used to prepare blown films comprising the resin composition of this invention, for example Macchi®'s COEX FLEX®. The process parameters which can be used are well-known to the person skilled in the art depending on the desired application of the film. For example: The die diameter can vary from 50 to 2000 mm. For example, 50 mm would be used for smaller film applications e.g. pouches for instance for medical purposes, and on the other hand 2000 mm would be used for larger applications, such as agricultural film applications. The blow-up ratio (BUR) can be of 1 to 5. The die-gap can be of 0.8 to 2.6 mm. The throughput can be of 10 kg/h to 2000 kg/h. The extrusion screw can have a diameter of from 30 mm to 150 mm. Preferably, the screw is a barrier screw.

The resin composition can also be used to prepare cast films. Typical cast film equipment are provided by Dolci, SML etc. Again, the skilled person would know how to run the cast film line to obtain the best possible results.

Preferably, the film is 10 μm to 500 μm thick, more preferably 10 to 100 μm, most preferably 10 to 75 μm.

The polyethylene resin composition according to the invention can be used to prepare films, which are monolayered or multilayered. Preferably, the film is monolayered. The monolayered film can be prepared from the polyethylene resin composition according to the invention in combination with other resins, such as LDPE, i.e. the film comprises of the polyethylene resin composition according to the invention.

More preferably, the monolayered film is prepared essentially from the polyethylene resin composition according to the invention i.e. the film consists essentially of the polyethylene resin composition according to the invention.

In a multilayered film, the polyethylene resin composition according to the invention can be used in one or several layers, alone or combination with other resins.

Dart impact strength, Elmendorf tear strength and slow puncture resistance are mechanical properties which may be important for polyethylene films depending on their application.

The polyethylene resin composition used to prepare films may also exhibit similar or even improved dart impact strength when compared with prior art polyethylenes of comparable density. For example, the Dart impact strength F50 of the film prepared with the resin composition according to the invention can be at least 180 g (which is the weight of the hammer required to break the film for 50% of the samples—F50), preferably at least 190 g, more preferably at least 200 g, even more preferably at least 210 g, most preferably at least 216 g, as measured on a film of 40 μm thickness. Thus, Dart impact strength (expressed in grams per μm of film thickness, g/μm) of the film prepared with the resin composition according to the invention can be at least $$1.4 * \left[2.01 + \frac{22.9}{1 + e^{(d-0.91815)/0.004119}}\right],$$

preferably at least $$1.45 * \left[2.01 + \frac{22.9}{1 + e^{(d-0.91815)/0.004119}}\right],$$

more preferably at least $$1.5 * \left[2.01 + \frac{22.9}{1 + e^{(d-0.91815)/0.004119}}\right].$$

The Dart impact strength F50 is measured according to ISO 7765-1, method A (diameter of the hammer 38.1 mm, fall height 66 cm) at 23° C. with 50% humidity. Dart impact strength F50 are measured on 40 μm thick blown film prepared using a blown film line equipment having a neck-in configuration with a extrusion screw diameter of 45 mm, a length to diameter ratio of the screw of 30, a die diameter of 120 mm, a blow-up ratio (BUR) of 2.5, a die gap of 1.4 mm, a frost line height of 320 mm, and cooling air at a temperature of 20° C.

Elmendorf tear strength was measured in the machine direction (MD) and in the transverse direction (TD). In the machine direction, the tear strength of the film prepared with the resin composition according to the invention can be at least $$1.3 * [(115/\pi) * (a\tan((d-0.92736)/(-0.00453322)) + 0.5 * \pi)]$$

N/mm (i.e. average Elmendorf tear strength in N per mm of film thickness), preferably at least $$1.35 * [(115/\pi) * (a\tan((d-0.92736)/(-0.00453322)) + 0.5 * \pi)]$$

N/mm, more preferably at least $$1.4 * [(115/\pi) * (a\tan((d-0.92736)/(-0.00453322)) + 0.5 * \pi)].$$

The Elmendorf tear strength of the film prepared with the resin composition according to the invention in the transverse direction is preferably at least 170 N/mm, more preferably from 180 N/mm, even more preferably at least from 190 N/mm, and most preferably at least from 200 N/mm. The tear strength can be up to 220 N/mm or 210 N/mm in the transverse direction.

The measurements of Elmendorf tear strength were carried out according to ASTM D 1922, on a blown film 40 μm thick prepared using a blown film line equipment having a neck-in configuration with a extrusion screw diameter of 45 mm, a length to diameter ratio of the screw of 30, a die diameter of 120 mm, a blow-up ratio (BUR) of 2.5, a die gap of 1.4 mm, a frost line height of 320 mm, and cooling air at a temperature of 20° C.

The slow puncture resistance of the film prepared with the resin composition according to the invention can be at least 65 J/mm of thickness of film, preferably at least 67 J/mm, more preferably at least 70 J/mm, even more preferably at least 72 J/mm and most preferably at least 75 J/mm. The slow puncture resistance can be up to 110 J/mm, preferably up to 100 J/mm or 95 J/mm. These measurements were carried out according to ASTM D5748, namely with a force of 200 N, a diameter of the puncturing rod of 0.75 in, a preload of 0.1 N, a puncturing speed of 10 in/min, carried out at an ambient temperature of around 23° C., on a blown film having a thickness of 40 μm prepared using a blown film line equipment having a neck-in configuration with a extrusion screw diameter of 45 mm, a length to diameter ratio of the screw of 30, a die diameter of 120 mm, a blow-up ratio (BUR) of 2.5, a die gap of 1.4 mm, a frost line height of 320 mm, and cooling air at a temperature of 20° C.

Gloss and haze are significant optical properties for polyethylene films.

The polyethylene resin composition can be used to produce films that exhibit less than about 20% haze, preferably less than 19%, more preferably less than 17%, even more preferably less than 16%, most preferably less than 15%. This can be achieved without the use of any clarity-enhancing agents i.e. nucleating agents. (In any case nucleating agents in polyethylene do not improve haze by very much. For example, a nucleating may improve a haze of 30% to not less than 25%). Films of lesser thickness exhibit even less haze, which is equivalent to higher clarity/transparency. However, even films which are thicker showed improved haze values, whilst still maintaining other mechanical properties. Haze in % is measured according to ISO 14782, herein at a thickness of 40 μm.

Gloss performance is also very good for the films produced with the polyethylene resin composition of the invention, measuring at at least 40% for a 40 μm thick film. The gloss is preferably at least 45%, most preferably at least 46%. The gloss can be up to 65%, or up to 64%. Gloss herein is measured according to ASTM D-2457 at an angle of 45°. It can be measured with reflectometers, for example a Byk-Gardner micro-gloss reflectometer.

Both gloss and haze are measured on 40 μm thick blown film prepared using a blown film line equipment having a neck-in configuration with a extrusion screw diameter of 45 mm, a length to diameter ratio of the screw of 30, a die diameter of 120 mm, a blow-up ratio (BUR) of 2.5, a die gap of 1.4 mm, a frost line height of 320 mm, and cooling air at a temperature of 20° C.

Geo-Membrane Applications

The present invention also encompasses geo-membranes produced by flat sheet extrusion or by blown sheet extrusion comprising the metallocene-catalyzed polyethylene resin according to the first aspect of the invention.

In particular, the present invention encompasses a geo-membrane comprising a metallocene-catalyzed polyethylene resin having a multimodal molecular weight distribution, comprising from 45% by weight to 75% by weight of a low density fraction, said fraction having a density below or equal to 918 g/cm$^3$ as measured following the method of standard test ISO 1183 at a temperature of 23° C.; wherein the density of the polyethylene resin is from 0.920 to 0.945 g/cm$^3$; wherein the $M_w/M_n$ of the polyethylene is of from 2.8 to 6; wherein the melt index MI2 of the polyethylene resin of from 0.1 to 5 g/10 min as measured following the method of standard test ISO 1133 Condition D at a temperature of 190° C. and under a load of 2.16 kg; and wherein the composition distribution breadth index (CDBI) of the polyethylene resin is below 70%, as analyzed by quench TREF (temperature rising elution fractionation) analysis.

Accordingly, the present invention provides geo-membrane applications produced by flat sheet extrusion or by blown sheet extrusion with a polyethylene resin according to the first aspect of the invention. In an embodiment, flat sheet extrusion is preferred.

The methods used to prepare geo-membranes can be either flat sheet extrusion or blown sheet extrusion. In both methods, an extruder can be used. Pellets can be fed into the extruder for example by a screw system, they can then heated, placed under pressure and formed into a hot plastic mass before reaching the die. Once the components are in the hot plastic state, they can be formed either into a flat sheet by a dove tail die or into a cylindrical sheet that is subsequently cut and folded out into a flat sheet.

In the flat sheet extrusion process, the hot plastic mass is fed into a dove tail die and exits through a horizontal straight slit. Depending upon the width of the die, one or more extruders may be needed to feed the hot plastic mass into the die. High quality metal oilers placed in front of the slit are used to control the thickness and surface quality of the sheets. These rollers are able to sustain pressure and temperature variations without deformation and they are connected to cooling liquids. The rollers are designed in order to control the sheet thickness to less than 3% variation over the whole width. A third roller may be used to further cool the sheet and to improve its surface finish. The surface finish of the sheet is directly proportional to the quality of the rollers' surface. The evenly cooled finished material is then fed over support rollers to be wrapped onto a core pipe and rolled up.

In the blown extrusion process the hot plastic mass is fed into a slowly rotating spiral die to produce a cylindrical sheet. Cooled air is blown into the centre of the cylinder creating a pressure sufficient to prevent its collapsing. The cylinder of sheeting is fed up vertically: it is then closed by being flattened over a series of rollers. After the cylinder is folded together, the sheet is cut and opened up to form a flat surface and then rolled up. The annular slit through which the cylinder sheet is formed is adjusted to control the sheet's thickness. Automatic thickness control is available in modern plants. Cooling is performed by the cool air blown into the centre of the cylinder and then during the rolling up process.

Coextrusion allows the combination of different materials into a single multi-layer sheet.

The geomembrane may additionally contain usual additives well known to those skilled in the art such as for example carbon black. These additives may be present in quantities generally between 0.01 and 10 weight % based on the weight of the polyethylene. For example the geomembrane may comprise from 1 to 4 weight % of carbon black, for example 2 to 3 weight %.

Grass Yarn Applications

The present invention also relates to yarn made with the polyethylene resin according the invention, in particular to slit film and monofilaments suitable for tufting into artificial grass or also known as artificial turf.

The present invention also encompasses an artificial grass tufted from slit film or monofilaments comprising the metallocene-catalyzed polyethylene resin according to the first aspect of the invention.

In particular, the present invention encompasses a yarn and preferably an artificial grass comprising a metallocene-catalyzed polyethylene resin having a multimodal molecular weight distribution, comprising from 45% by weight to 75% by weight of a low density fraction, said fraction having a density below or equal to 918 g/cm$^3$ as measured following the method of standard test ISO 1183 at a temperature of 23° C.;

wherein the density of the polyethylene resin is from 0.920 to 0.945 g/cm³;
wherein the $M_w/M_n$ of the polyethylene is of from 2.8 to 6;
wherein the melt index MI2 of the polyethylene resin of from 0.1 to 5 g/10 min as measured following the method of standard test ISO 1133 Condition D at a temperature of 190° C. and under a load of 2.16 kg; and
wherein the composition distribution breadth index (CDBI) of the polyethylene resin is below 70%, as analyzed by quench TREF (temperature rising elution fractionation) analysis.

The polyethylene for the slit film and monofilaments for the artificial grass may additionally contain usual additives well known to those skilled in the art such as antioxidants, stabilizers, processing aids, fillers, flame retardants, coloured pigments or similar. These additives may be present in quantities generally between 0.01 and 15 weight % based on the weight of the polyethylene.

The yarn (slit film and monofilaments) are suitable for use in artificial turfs or grasses including synthetic sporting surfaces.

The slit film or monofilament or similar according to all aspects of the present invention may typically be in stretched form.

The slit film or monofilament or similar may have a draw ratio in the range 1:3 to 1:8, preferably 1:3 to 1:6, more preferably 1:3 to 1:4.

EXAMPLES

The following illustrate the concept of the invention but by no means limit the scope of the invention.

The following polymerizations were carried out in a double loop reactor comprising 2 reactors Rx1 and Rx2 to obtain polyethylene resin compositions G to M according to the invention. Polymerizations were carried at a temperature of 95° C. under a pressure of about 40 bars with a residence time of about 66 min in Rx1 and at a temperature of 83° C. under a pressure of about 40 bars with a residence time of about 35 min in Rx2 using an ethylene-bis(tetrahydroindenyl) zirconium dichloride metallocene catalyst system with tri-isobutylaluminium (TIBAL) as the activating agent.

The following polymerizations were carried out in a double loop reactor comprising 2 reactors Rx1 and Rx2 to obtain polyethylene resin compositions 8G, 8H, according to the invention. Polymerizations were carried at a temperature of 83° C. under a pressure of about 40 bars with a residence time of about 64 min in Rx1 and at a temperature of 83° C. under a pressure of about 40 bars with a residence time of about 34 min in Rx2 using an ethylene-bis(tetrahydroindenyl) zirconium dichloride metallocene catalyst system with tri-isobutylaluminium (TIBAL) as the activating agent.

The following polymerizations were carried out in a double loop reactor comprising 2 reactors Rx1 and Rx2 to obtain polyethylene resin compositions 127, 128, 129, according to the invention. Polymerizations were carried at a temperature of 90° C. under a pressure of about 40 bars with a residence time of about 1.7 hours in Rx1 and at a temperature of 83° C. under a pressure of about 40 bars with a residence time of about 0.64 hours in Rx2 using an ethylene-bis(tetrahydroindenyl) zirconium dichloride metallocene catalyst system with tri-isobutylaluminium (TIBAL) as the activating agent.

Information regarding the physical properties of the resin compositions can be found in Table 1a and Table 3. Information regarding the polymerization conditions in Rx1 and Rx2 can be found in Tables 1b and 1c, respectively.

The molecular weight ($M_n$ (number average molecular weight), $M_w$ (weight average molecular weight) and $M_z$ (z-average molecular weight)) and molecular weight distributions d and d' were determined were determined by size exclusion chromatography (SEC) and in particular by gel permeation chromatography (GPC). Briefly, a GPCV 2000 from Waters was used: 10 mg polyethylene sample was dissolved at 160° C. in 10 ml of trichlorobenzene for 1 hour. Injection volume: about 400 µl, automatic sample preparation and injection temperature: 160° C. Column temperature: 145° C. Detector temperature: 160° C. Two Shodex AT-806MS (Showa Denko) and one Styragel HT6E (Waters) columns were used with a flow rate of 1 ml/min. Detector: Infrared detector (2800-3000 cm-1). Calibration: narrow standards of polystyrene (PS) (commercially available). Calculation of molecular weight Mi of each fraction i of eluted polyethylene is based on the Mark-Houwink relation ($\log_{10}(M_{PE})=0.965909-\log_{10}(M_{PS})-0.28264$) (cut off on the low molecular weight end at $M_{PE}=1000$).

The molecular weight averages used in establishing molecular weight/property relationships are the number average ($M_n$), weight average ($M_w$) and z average ($M_z$) molecular weight. These averages are defined by the following expressions and are determined form the calculated $M_i$:

$$M_n = \frac{\sum_i N_i M_i}{\sum_i N_i} = \frac{\sum_i W_i}{\sum_i W_i/M_i} = \frac{\sum_i h_i}{\sum_i h_i/M_i}$$

$$M_w = \frac{\sum_i N_i M_i^2}{\sum_i N_i M_i} = \frac{\sum_i W_i M_i}{\sum_i M_i} = \frac{\sum_i h_i M_i}{\sum_i M_i}$$

$$M_z = \frac{\sum_i N_i M_i^3}{\sum_i N_i M_i^2} = \frac{\sum_i W_i M_i^2}{\sum_i W_i M_i} = \frac{\sum_i h_i M_i^2}{\sum_i h_i M_i}$$

Here $N_i$ and $W_i$ are the number and weight, respectively, of molecules having molecular weight Mi. The third representation in each case (farthest right) defines how one obtains these averages from SEC chromatograms. $h_i$ is the height (from baseline) of the SEC curve at the $i_{th}$ elution fraction and $M_i$ is the molecular weight of species eluting at this increment.

The melt index MI2 and high load melt index HLMI are measured by the method of standard test ISO 1133 Condition D respectively under a load of 2.16 kg and 21.6 kg and at a temperature of 190° C.

Polydispersity Index (PI) was determined at a temperature of 190° C. by using a parallel plates rheometer model ARES-G2 marketed by TA instrument (USA), operating at an oscillation frequency which increases from 0.1 rad/sec to about 300 rad/sec. From the crossover modulus one can derive the PI by way of the equation: P.I.=10⁶/Gc in which Gc is the crossover modulus which is defined as the value (expressed in Pa) at which G'=G" wherein G is the storage modulus and G" is the loss modulus.

The CDBI (composition distribution breadth index) is a measure of the breadth of the distribution of copolymer composition, with regard to the level of comonomer incorporated into the polymer, the latter reducing crystallinity of domains made from such polymer chains by means of short side chain branching as compared to crystalline homopolymer. This is described, for example, in WO 93/03093. The CDBI is defined as the percent by weight or mass fraction of the copolymer molecules having a comonomer contents of ±25% of the mean total molar comonomer content, i.e. the share of comonomer molecules whose comonomer content is within 50% of the average comonomer content.

CDBI was determined from cumulative SCB distribution as obtained by TREF (temperature rising elution fraction) analysis (quench or slow cooling conditions). The TREF analysis were performed with TREF instrument by Polymer ChAR (Valencia, Spain). The conditions of TREF were as follows.

Quench ATREF (analytical TREF): a solution of 1 mg/ml of polyethylene resin in 1-2-4 trichlorobenzene (TCB) was obtained by dissolution at 160° C. for one hour. The solution was injected in the ATREF column at about 30° C. with a flow rate of 0.5 ml/min. The column with the precipitated polyethylene was then eluted at a heating rate of 2° C./min up to 130° C. The flow rate was 0.5 ml/min during the elution step.

Classical ATREF: a solution of 0.05% (0.5 mg/ml) of polyethylene was prepared as described for the quench TREF at 160° C. and was injected on the ATREF column and allowed to slowly cool (at 6° C./h) from 100 to 30° C. The flow rate during heating from 30° C. to 120° C. was 0.4 ml/min and the heating rate was 1° C./min.

PTREF (preparative TREF): The sample (about 6 g) was dissolved in xylene at 130° C. at a concentration of 1 g/100 ml. The hot solution (stabilized with 1000 ppm Irganox 1010) was loaded into the inner part of the glass column of the PTREF apparatus at a temperature of 130° C. The PTREF column was then cooled at a rate of 2.4° C./h down to 30° C. (42 h). After precipitation of the polyethylene onto the column packing, the low density fraction was recovered by heating to a temperature that is guided by classical ATREF in TCB: the separation temperature was about equal to the ATREF temperature corresponding to a level of SCB that will give a density about 0.92 g/cm3 (SCB 10/1000 C) minus 10° C. (as PTREF is conducted in xylene not TCB). This corresponds for this PTREF apparatus to 77° C. After 30 min at the selected temperature, the first fraction was then obtained by connecting the column to a recovery tank through which the solvent was pumped at 10 ml/min. The higher density fraction was then obtained by eluting at 100° C. under similar conditions as for the first fraction. Both eluted fractions were precipitated in methanol, filtered on PTFE filters and dried.

Column dimensions (ATREF): 150×3.9 mm (Lx D), 1.8 ml inner volume, detector DRI (differential refractive index), Geometric resolution of the column: heating rate (° C./min)*Load volume (ml)/flow rate (ml/min): 3.6° C./column. The load volume was about 0.8× column volume (80% packing material). For quench ATREF, Geometric resolution of the column was 5.76° C./column.

Calibration for SCB (Elution temperature-SCB) was established for each conditions using several monomodal mPE resins (Compositional Distribution Breadth Index, CDBI, >94%) by classical ATREF) of density 0.923-0.955 g/cm³ synthesized with the same comonomer and catalyst system as the polyethylene resin according to this invention.

FIG. 1 shows Chemical Composition Distribution (CCD) curves obtained for resin 129 with two ATREF cooling conditions (quench, 6° C./h). For comparison, comparative example a monomodal metallocene-catalyzed polyethylene resin obtained with the same catalyst system was tested. The bimodal character of resin 129 was apparent as a shoulder in quench TREF and as two well separated peaks for TREF with slow cooling (classical TREF).

Figure 2:
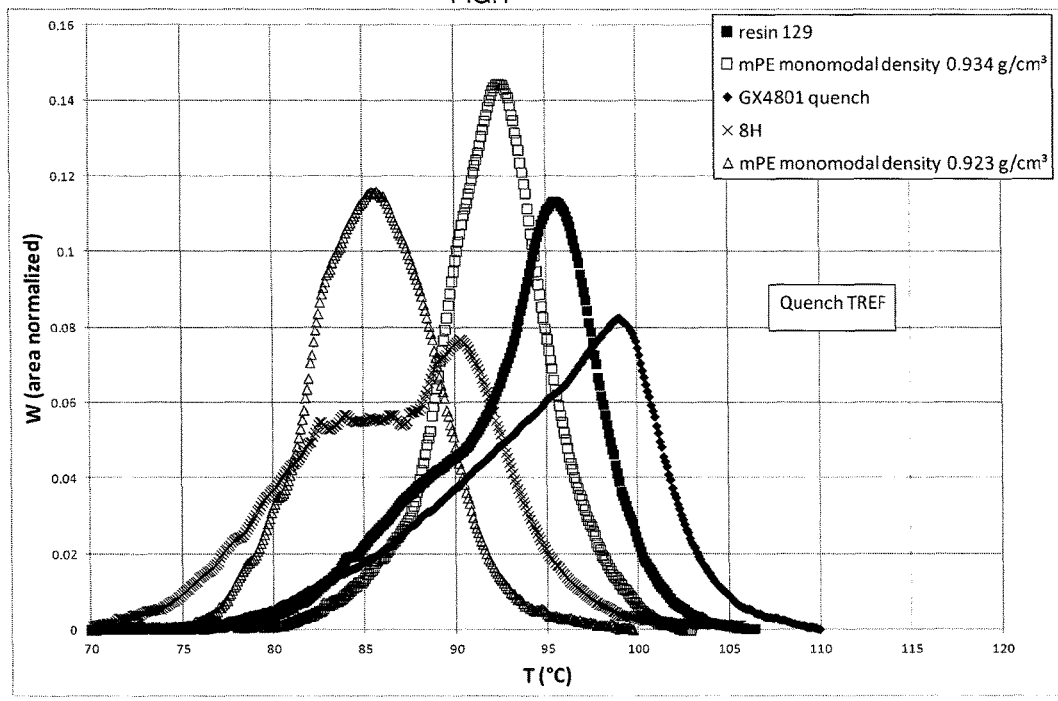
FIG. 2 represents a graph showing quench ATREF profiles for resin 129 and resin 8H, and comparatively for two monomodal mPE (density 0.923 g/cm$^3$ and 0.934 g/cm$^3$) and bimodal PE GX4081 from Basell.

FIG. 2 shows quench ATREF profiles for resin 129 and resin 8H, and comparatively for two monomodal mPE (density 0.923 g/cm³ and 0.934 g/cm³) and bimodal PE GX4081 from Basell. The ATREF profiles were bimodal for resin 129 and resin 8H. Bimodal PE GX4081 resin exhibits a skewed CCD curve towards high SCB with no clear sign of bimodality in quench ATREF conditions. For the two monomodal mPE resins, a broad monomodal peak was observed and, weight fraction SCB calculated from quench ATREF of monomodal mPE resins (9.2/1000 C and 4.4/1000 C for 0.923 and 0.934 g/cm³, respectively) agreed with NMR values.

Figure 3:
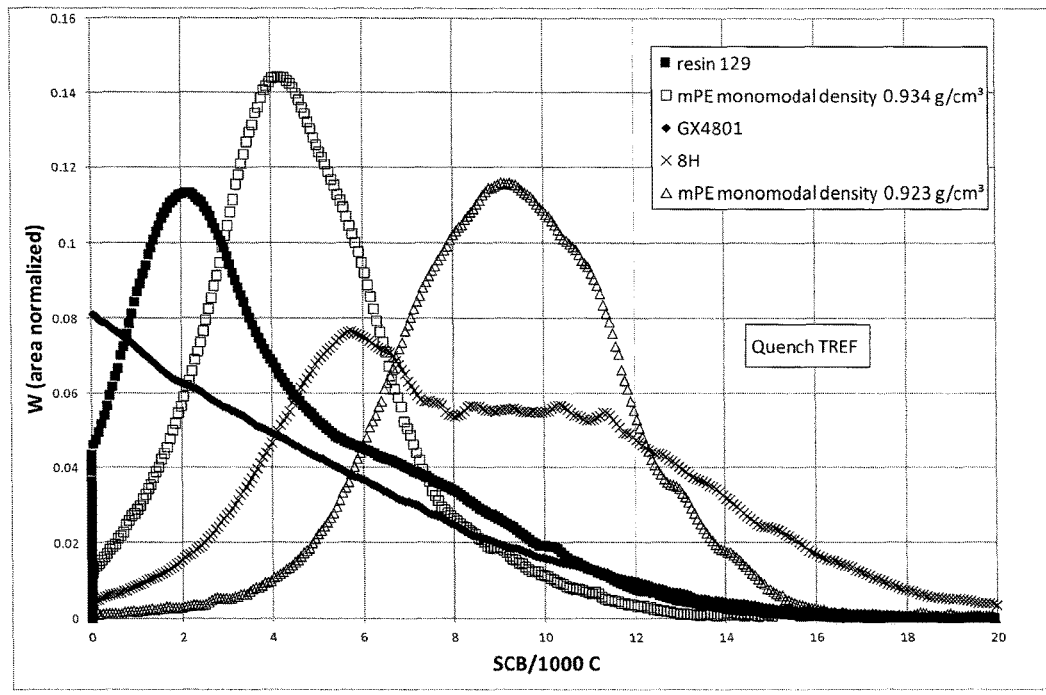
FIG. 3 represents a graph showing the Chemical Composition Distribution (CCD) curves obtained for resin 129 and resin 8H, and comparatively for two monomodal mPE (density 0.923 g/cm³ and 0.934 g/cm³) and bimodal PE GX4081 from Basell with quench ATREF.

After converting temperature axis in SCB axis (FIG. 3), the amount of HDPE crystallites (seen as SCB=0) observed was very high for GX4081 and no peak was observed for the remaining resins. This means that the co-crystallized amount was low and very broad. The resin 129 exhibited clear bimodal composition (shoulder) and the extent of crystals eluted was narrower than for GX4081. The resin 8H exhibited a clear bimodal composition distribution. Without being bound by theory, it is believe that, in order to have good mechanical properties, the peaks corresponding to LLDPE and HDPE should be well separated (this will give a low CDBI) and for good optical properties co-crystals should be formed within a narrow range of crystallization temperature (corresponding to elution temperature or apparent SCB).

Figure 4:
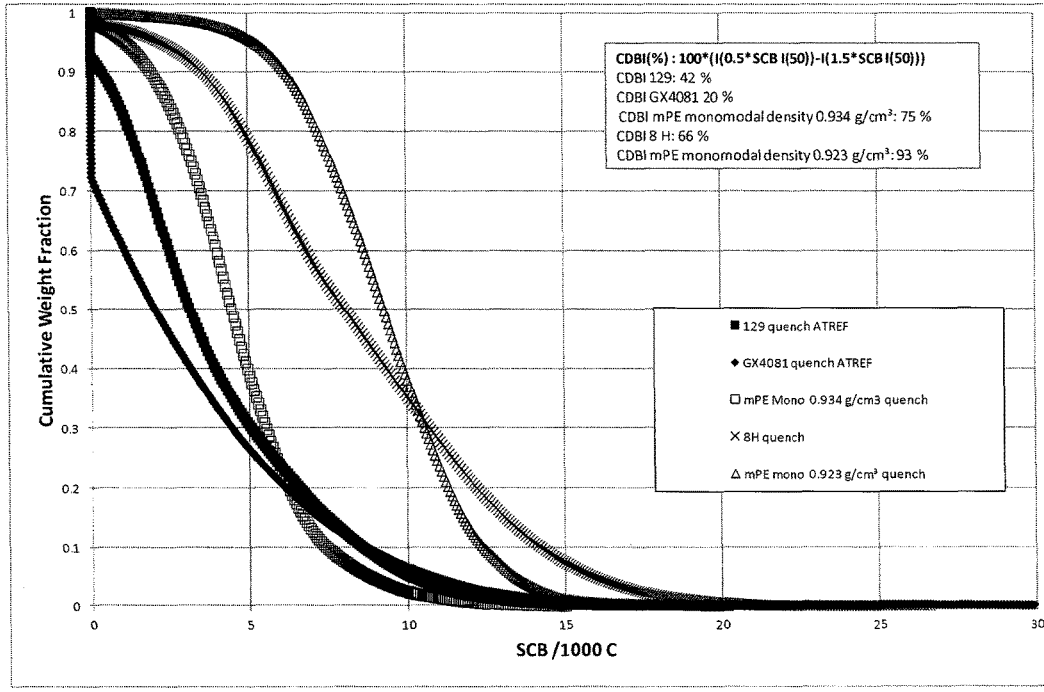
FIG. 4 represents a graph plotting the cumulative weight fraction as a function of SCB/1000C for resin 129 and resin 8H, and comparatively for two monomodal mPE (density 0.923 g/cm³ and 0.934 g/cm³) and bimodal PE GX4081 from Basell.

In FIG. 4, the cumulative distribution (same resins as in FIG. 3) needed to calculate CDBI as taught in WO93/03093 (p. 18-19 and FIG. 17) are shown. Values of CDBI computed from cumulative distribution are shown the Table A.

TABLE A

| Resin | CDBI (%) quench TREF |
|---|---|
| 129 | 42 |
| GX4081 | 20 |
| mPE monomodal density 0.934 g/cm³ | 75 |
| 8H | 66 |
| mPE monomodal density 0.923 g/cm³ | 93 |

Figure 5:
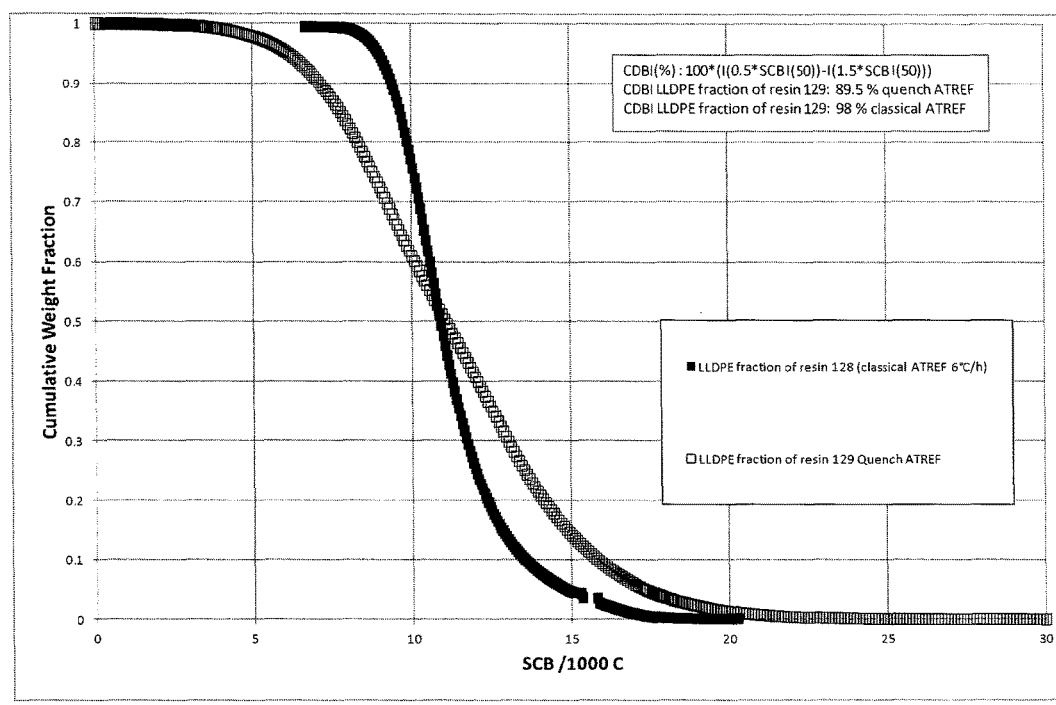
FIG. 5 represents a graph plotting the cumulative weight fraction as a function of SCB/1000C for the low density fraction of resin 129 obtained with two ATREF cooling conditions (quench, 6° C./h).

From FIG. 1, it is clear that low density fraction of resin 129 is narrow (CDBI >90%). Indeed from the recovered low density fraction (52%), a quench ATREF was conducted and from its cumulative distribution curve, a CDBI of 89.6% was derived. The ATREF in classical mode on that low density fraction gave a CDBI of 98% (FIG. 5, Table 2).

$g_{rheo}$ is determined according to the disclosure in WO 2008/113680:

$$g_{rheo}(PE) = \frac{M_w(SEC)}{M_w(\eta_0, MWD, SCB)}$$

wherein $M_w$ (SEC) is the weight average molecular weight obtained from size exclusion chromatography expressed in kDa, as described above, and wherein $M_w$ ($\eta_0$, MWD, SCB) is determined according to the following:

$$M_w(\eta_0, MWD, SCB) = \exp(1.7789 + 0.199769 \ln M_n + 0.209026(\ln \eta_0) + 0.955(\ln \rho) - 0.007561(\ln M_z)(\ln \eta_0) + 0.02355(\ln M_z)^2)$$

The value of $M_w$ ($\eta_0$, MWD, SCB) was determined by Rheological Dynamic Analysis (RDA) and is equal to $M_w$ (SEC) for linear PE (PE without LCB). Zero shear viscosity is proportional to $M_w$ (SEC) to a power close to $3.4^{th}$ (in our case to about the 3.6 th power). Corrections due to molecular weight distribution and short chain branching (SCB) are used to describe zero shear viscosity as function of $M_w$ (SEC). Therefore, it is why, beside zero shear viscosity, Mn and Mz as well as ρ (density, d) appear in the expression relating $M_w$ ($\eta_0$, MWD, SCB) determined by rheology to zero shear viscosity. For linear PE, $g_{rheo}$ is equal to 1.0+/−0.05. If, at a given $M_w$ (SEC) value, zero-shear viscosity increases above that of a linear PE, then $g_{rheo}$ will be below 1.

Density p is measured in g/cm³ and measured according to ISO 1183 at a temperature of 23° C.

Zero shear viscosity $\eta_0$ in Pa·s is obtained from a frequency sweep experiment combined with a creep experiment, in order to extend the frequency range to values down to $10^{-4}$ s$^{-1}$ or lower, and taking the usual assumption of equivalence of angular frequency (rad/s) and shear rate. Zero shear viscosity $\eta_0$ is estimated by fitting with Carreau-Yasuda flow curve (η–W) at a temperature of 190° C., obtained by oscillatory shear rheology on ARES-G2 equipment (manufactured by TA Instruments) in the linear viscoelasticity domain. Circular frequency (W in rad/s) varies from 0.05-0.1 rad/s to 250-500 rad/s, typically 0.1 to 250 rad/s, and the shear strain is typically 10%. In practice, the creep experiment is carried out at a temperature of 190° C. under nitrogen atmosphere with a stress level such that after 1200 s the total strain is less than 20%. The apparatus used is an AR-G2 manufactured by TA instruments.

The polyethylene resin compositions were transformed into 40 μm thick blown films using a blown film line equipment from Macchi® having a neck-in configuration with a extrusion screw diameter of 45 mm, a length to diameter ratio of the screw of 30, a die diameter of 120 mm, a blow-up ratio (BUR) of 2.5, a die gap of 1.4 mm, a frost line height of 320 mm, and cooling air at a temperature of 20° C.

The mechanical and optical properties can be found in Tables 3 and Table 4 in comparison with prior art commercial resins: Lupolen GX 4081 (from Basell), Borstar FB 2310 (from Borealis), 1018CA (from Exxon), monomodal Cr-catalyzed polyethylene HF513 (Total Petrochemicals), Marlex D350 (Chevron Phillipps) and a mPE monomodal (Total Petrochemicals) also prepared with an ethylene-bis (tetrahydroindenyl) zirconium dichloride containing metallocene catalyst system, and resin 780B and 780D (Total Petrochemicals) which are bimodal medium density polyethylene prepared with ethylenebis(tetrahydroindenyl) zirconium dichloride in a double loop reactor.

The results show that the polyethylene resin compositions according to the invention have a better balance of optical and mechanical properties.

Lupolen GX 4081 (from Basell) and Borstar FB 2310 (from Borealis) for example have good mechanical properties, but very low gloss and high haze, whereas the monomodal mPE has very high gloss and low haze, but mechanical properties that are not as suitable for certain film applications. Furthermore, for Lupolen GX 4081, processing is worst (higher extrusion pressure, less stability).

Resins of the invention however retain very good mechanical properties, such as tear strength, slow puncture resistance and dart impact strength, whilst also having very good optical properties. This was made possible (without being bound by theory) by increasing the proportion of the low density, high molecular weight fraction in the resin composition prepared using bisindenyl or bistetrahydroindenyl metallocene based catalyst systems. It should be noted that particularly surprisingly the slow puncture for the polyethylene resin composition according to the invention was higher than for the monomodal equivalent using the same catalyst, although the opposite was actually expected.

It has also been observed that polyethylene resin compositions according to the invention are also easily processable due to their high melt strength. Also less neck-in was observed during blowing of the films.

Geomembranes

Stress crack resistance was evaluated following the Full notched Creep test (FNCT) as measured according to ISO 16770. The test uses a rod-shaped specimen having the following dimension 90×6×6 mm with notch depth of 1 mm to determine the resistance of material to brittle fractures caused by long-term, low-level tensile stress. The test following the method of standard test ISO 16770 requires that the specimens be placed in a surfactant solution, selected here as an Maranyl 2% solution, at a temperature of 50° C., for an extended period of time, and be subject to a tensile stress equal to 9 MPa. Results for the mean failure time are presented in Table 5.

The results were compared with two comparative resin (a) a monomodal metallocene-catalyzed polyethylene (mPE1) having a MI2 of 0.2 g/10 min and a density of 0.933 g/cm3, and (b) a monomodal metallocene-catalyzed polyethylene (mPE2) having a MI2 of 1.0 g/10 min and a density of 0.934 g/cm3. mPE1 is typically used in geomembrane application with acceptable properties.

Stress crack resistance for mPE1 and mPE2 was evaluated following the Single Point Notched Constant Tensile Load (SPNCTL). The test used a notched dumb-bell-shaped specimen to determine the resistance of material to brittle fractures caused by long-term, low-level tensile stress. The test following the method of standard test ASTM D 5397 requires that the specimens be placed in a surfactant solution, selected here as an Ipegal 10% solution, at a temperature of 50° C., for an extended period of time, and be subject to a tensile stress equal to 15% of the material's yield stress. In the field of geo-membrane applications, failure may not occur before at least 400 hours of exposure. mPE1 failed the test with a SPNCTL below 400 hours, while mPE2 showed a SPNCTL of above 400 hours.

In view of these FNCT results for mPE1 and mPE2, by extrapolation, the present resins should have good SPNCTL behavior, thereby showing their suitability for geomembrane application.

Grass Yarn.

Resins I and M were tested on an Oerlikon Barmag Compact line (Oerlikon Barmag, Germany), and compared with a monomodal metallocene resin A. The characteristic of comparative resin A are show in Table 6.

Yarns were prepared and tested using the following conditions:

Recipe: 6% by weight of a BASF color/UV MB (Sicolen 90-010365)+1% by weight of Viba PPA (733E);
Titre: 2000 dtex monofilaments
4*12 strands emerging from 1 die.
Extrusion was performed at T°: 190/220° and at 230° C. at the die section.
Water cooling bath T°: 35° C.
3 stretching ovens in air
Melt fracture was evaluated by touch, when the yarn was completely smooth at touch a score NO was attributed. When the yarn was completely rough the score was yes. Intermediate roughness scored YES/NO.

The results are shown in Table 7. Compared to resin A, the present resins were found to improve the maximum speed without melt fracture and at reasonable pressures. Compared to resin A, the present resins were found to enable a decrease in pressure at the die by around 20%, and a delay in the appearance of melt fracture on the yarns.

The present resins can be run at higher speed as a +50% speed increase was measured compared to resin A (100 m/min vs 67 m/min).

TABLE 1a

| Resin Composition of the invention | Rx1 fraction | | | | | Rx2 fraction | | | | | Pellets | | | | |
|---|---|---|---|---|---|---|---|---|---|---|---|---|---|---|---|
| | MI-2 (g/10') | Density (g/cm³) | $M_n$ (kDa) | $M_w$ (kDa) | Wt (%) | calc. MI-2 (g/10') | calc. density (g/cm³) | $M_n$ (kDa) | $M_w$ (kDa) | $M_w$Rx1/ $M_w$Rx2 | MI-2 (g/10') | Density (g/cm³) | $M_n$ kDa | $M_w$ kDa | C6 (wt %) |
| G | 26.0 | 0.955 | 16.6 | 40.71 | 42 | 0.08 | 0.918 | 43.37 | 112.76 | 2.77 | 0.9 | 0.934 | 24.5 | 82.5 | 4.7 |
| I | 52.0 | 0.958 | 13.95 | 34.17 | 42 | 0.03 | 0.917 | 46.16 | 119.60 | 3.51 | 0.7 | 0.933 | 22.6 | 83.7 | 4.3 |
| J | 108.0 | 0.960 | 11.75 | 28.79 | 42 | 0.04 | 0.916 | 46.41 | 120.66 | 4.19 | 1.1 | 0.934 | 20.5 | 81.8 | 4.4 |
| K | 98.0 | 0.962 | 11.99 | 29.38 | 42 | 0.02 | 0.915 | 49.51 | 128.73 | 4.38 | 0.8 | 0.933 | 21.7 | 87.2 | 4.4 |
| L | 91.0 | 0.964 | 12.09 | 29.62 | 38 | 0.03 | 0.917 | 48.73 | 126.69 | 4.28 | 0.6 | 0.934 | 22.6 | 90 | 3.9 |
| M | 150.5 | 0.963 | 10.54 | 25.82 | 42 | 0.02 | 0.912 | 49.50 | 128.70 | 4.98 | 0.8 | 0.933 | 19.2 | 85.7 | 4.3 |
| 8G | 17.4 | 0.930 | 18.06 | 44.24 | 44 | 0.02 | 0.916 | 59.92 | 155.79 | 3.52 | 0.28 | 0.9221 | 29.6 | 109.5 | 5.9 |
| 8H | 23.8 | 0.929 | 16.81 | 41.18 | 43 | 0.01 | 0.915 | 62.58 | 162.71 | 3.91 | 0.31 | 0.9212 | 28.4 | 109.6 | 6.6 |
| 127 | 26.00 | 0.955 | 16.47 | 40.35 | 42 | 0.05 | 0.912 | 44.73 | 116.30 | 2.88 | 0.69 | 0.9298 | 23.9 | 84.4 | 4.4 |
| 129 | 26.00 | 0.955 | 16.47 | 40.35 | 42 | 0.03 | 0.913 | 51.16 | 133.03 | 3.30 | 0.47 | 0.9304 | 24.7 | 94.1 | 4.2 |
| 128 | 26.00 | 0.955 | 16.47 | 40.35 | 42 | 0.05 | 0.914 | 44.07 | 114.58 | 2.84 | 0.68 | 0.9313 | 23.4 | 83.4 | 4.4 |

Calculated MI2 and density based on: LogMIfinal = wt %1stx LogMI1st + wt %2ndx LogMI2nd MI2 of the final resin can also be estimated based on M2 = exp(10.588 + 0.7333*Ln(D) − 0.582*(ln(Mw))²)

TABLE 1b

| Resin Composition of the invention | Rx1 Reaction conditions | | | | | | | | | |
|---|---|---|---|---|---|---|---|---|---|---|
| | Tibal ppm | Ethylene feed kg/h | Hexene feed kg/h | Hydrogen feed Normal Liter/h | isobutane kg/h | Ethylene (C2) Off-gas 1 WT % | Hexene (C6) Off-gas WT % | Hydrogen (H2) Off-gas VOL % | C6/C2 OG | H2/C2 OG |
| G | 313 | 22.0 | 0.28 | 25.5 | 60 | 5.87 | 0.54 | 0.01 | 0.09 | 0.001 |
| I | 302 | 22.5 | 0.28 | 31.2 | 60 | 5.93 | 0.54 | 0.01 | 0.09 | 0.001 |
| J | 313 | 22.5 | 0.40 | 37.0 | 60 | 5.74 | 0.63 | 0.01 | 0.11 | 0.001 |
| K | 295 | 22.5 | 0.25 | 38.0 | 60 | 6.08 | 0.50 | 0.01 | 0.08 | 0.001 |
| L | 302 | 22.5 | 0.17 | 39.0 | 60 | 6.12 | 0.38 | 0.01 | 0.06 | 0.001 |
| M | 302 | 22.5 | 0.29 | 45.0 | 60 | 6.23 | 0.50 | 0.01 | 0.08 | 0.001 |
| 8G | 313 | 21.0 | 3.20 | 19.0 | 50 | 3.58 | 1.25 | 0.00 | 0.35 | 0.000 |
| 8H | 313 | 21.0 | 4.00 | 20.0 | 50 | 3.75 | 3.43 | 0.00 | 0.91 | 0.001 |
| 127 | 46 | 3100 | 34 | 4500 | 2100 | 2.90 | 0.33 | 0.00 | 0.11 | 0.000 |
| 129 | 42 | 3100 | 31 | 4550 | 2100 | 3.05 | 0.29 | 0.00 | 0.10 | 0.000 |
| 128 | 46 | 3100 | 28 | 4500 | 2100 | 2.90 | 0.27 | 0.00 | 0.09 | 0.000 |

TABLE 1c

| Resin Composition of the invention | Rx2 Reaction conditions | | | | | | | | |
|---|---|---|---|---|---|---|---|---|---|
| | Tibal ppm | Ethylene feed kg/h | Hexene feed kg/h | Hydrogen feed Normal Liter/h | isobutane kg/h | Ethylene Off-gas WT % | Hexene Off-gas WT % | Hydrogen Off-gas VOL % | C6/C2 |
| G | 208 | 27 | 6.55 | 7 | 45 | 4.79 | 6.33 | 0 | 1.32 |
| I | 194 | 27 | 6.55 | 6 | 45 | 4.78 | 7.17 | 0 | 1.50 |
| J | 204 | 27 | 6.70 | 5 | 45 | 4.26 | 6.77 | 0 | 1.59 |
| K | 194 | 27 | 7.20 | 5 | 45 | 4.33 | 7.40 | 0 | 1.71 |
| L | 208 | 32 | 7.20 | 6 | 45 | 5.00 | 6.50 | 0 | 1.30 |
| M | 208 | 27 | 7.00 | 4 | 45 | 4.30 | 5.53 | 0 | 1.29 |
| 8G | 208 | 29 | 3.70 | 2 | 45 | 3.48 | 3.30 | 0 | 0.95 |
| 8H | 194 | 29 | 3.70 | 2 | 45 | 3.72 | 3.95 | 0 | 1.06 |
| 127 | 21 | 4299 | 559 | 1195 | 3430 | 5.12 | 4.879 | 0 | 0.95 |
| 129 | 20 | 4293 | 562 | 845 | 3545 | 4.99 | 4.77 | 0 | 0.95 |
| 128 | 21 | 4299 | 571 | 1200 | 3430 | 5.12 | 4.747 | 0 | 0.93 |

TABLE 2

| CDBI determination | | | |
|---|---|---|---|
| | | 8H | 129 |
| CDBI pellet | % | 66 | 42 |
| CDBI Rx2fraction | % | NM | 98 |

CDBI pellets determined by quench ATREF
CDBI Rx2fraction determined by classical ATREF (cooling rate 6° C./hour) of the Rx2 fraction obtained by PTREF

TABLE 3

| Resin composition and film properties | | | | | | | |
|---|---|---|---|---|---|---|---|
| | | Lupolen GX 4081 | Borstar FB 2310 | mPE monomodal | 1018CA | HF513 | Mar-flex D350 |
| GPC pellet | $M_n$ (Da) | 15272 | 12616 | 34517 | 38242 | 16006 | 35881 |
| | $M_w$ (Da) | 91749 | 191866 | 80596 | 99435 | 204136 | 96809 |
| | $M_z$ (Da) | 258282 | 1457161 | 143137 | 185355 | 2053178 | 185140 |
| | D ($M_w/M_n$) | 6 | 15.2 | 2.3 | 2.60 | 12.8 | 2.7 |
| | D' ($M_z/M_w$) | 2.8 | 7.6 | 1.8 | 1.86 | 10.1 | 1.9 |
| DENSITY | g/cm³ | 0.935 | 0.933 | 0.934 | 0.918 | 0.934 | 0.933 |
| MI2 | g/10 min | 1.4 | 0.3 | 1.0 | 1.0 | 0.15 | 0.9 |
| $g_{rheo}$ | | 1.0 | 1.0 | 0.61 | 1.0 | 0.69 | 1 |
| PI | $10^6$/Gc (Pa$^{-1}$) | 9.5 | 27.8 | 5.11 | 5.24 | 28.1 | 4.3 |
| DART | | | | | | | |
| F50 du Dart | g | 247 | 200 | 101 | >900 | 112 | 135 |
| Dart/thickness | g/μm | 5.9 | 5.4 | 2.5 | NM | 2.7 | 3.1 |
| ELMENDORF MD | | | | | | | |
| Avg thickness | mm | 0.04 | 0.04 | 0.04 | 0.04 | 0.04 | 0.04 |
| Avg Elmendorf MD | N | 2.53 | 1.16 | 0.68 | 6.13 | 0.54 | 0.88 |
| Avg Elmendorf MD/thickness | N/mm | 60 | 31 | 17 | 149 | 13 | 20 |
| ELMENDORF TD | | | | | | | |
| Avg thickness | mm | 0.04 | 0.04 | 0.04 | 0.04 | 0.04 | 0.04 |
| Avg Elmendorf TD | N | 5.03 | 8.98 | 3.97 | 6.64 | 20.03 | 2.68 |
| Avg Elmendorf TD/thickness | N/mm | 120 | 241 | 99 | 162 | 484 | 62 |
| GLOSS at 45° | | | | | | | |
| Avg Gloss | % | 27.6 | 4.5 | 61.1 | 58.7 | 6.9 | 72.7 |
| HAZE | | | | | | | |
| Avg Haze | % | 29.8 | 79.4 | 10.1 | 10.9 | 69.4 | 8.7 |
| SLOW PUNCTURE | | | | | | | |
| Avg Max Force/thickness | N/mm | 1142 | 1127 | 1340 | NM | 1163 | NM |
| Avg Force Rupture/thickness | N/mm | 1056 | 1119 | 1307 | NM | 806 | NM |
| Avg Energy/thickness | J/mm | 49 | 51 | 55 | NM | 50 | NM |
| | | G | I | J | K | L | M |
| GPC pellet | $M_n$ (Da) | 24486 | 22596 | 20512 | 21701 | 22643 | 19218 |
| | $M_w$ (Da) | 82514 | 83747 | 81776 | 87174 | 89959 | 85748 |
| | $M_z$ (Da) | 185401 | 202496 | 199228 | 213035 | 208750 | 225314 |
| | D ($M_w/M_n$) | 3.4 | 3.7 | 4 | 4 | 4 | 4.5 |
| | D' ($M_z/M_w$) | 2.2 | 2.4 | 2.4 | 2.4 | 2.3 | 2.6 |
| DENSITY | g/cm³ | 0.934 | 0.933 | 0.934 | 0.933 | 0.934 | 0.933 |
| MI2 | g/10 min | 0.9 | 0.7 | 1.1 | 0.8 | 0.6 | 0.8 |
| $g_{rheo}$ | | 0.63 | 0.64 | 0.67 | 0.66 | 0.60 | 0.68 |
| PI | $10^6$/Gc (Pa$^{-1}$) | 8.71 | 9.22 | 10.56 | 10.32 | 9.22 | 12.04 |
| DART | | | | | | | |
| F50 du Dart | g | 207 | 199 | 211 | 224 | 233 | 247 |
| Dart/thickness | g/μm | 5.4 | 5.1 | 5.4 | 5.7 | 6.0 | 5.5 |
| ELMENDORF MD | | | | | | | |
| Avg thickness | mm | 0.04 | 0.04 | 0.04 | 0.04 | 0.04 | 0.04 |
| Avg Elmendorf MD | N | 1.62 | 1.57 | 1.70 | 1.81 | 1.68 | 1.95 |
| Avg Elmendorf MD/thickness | N/mm | 43 | 40 | 43 | 46 | 43 | 43 |

TABLE 3-continued

Resin composition and film properties

ELMENDORF TD

|  |  |  |  |  |  |  |  |
|---|---|---|---|---|---|---|---|
| Avg thickness | mm | 0.04 | 0.04 | 0.04 | 0.04 | 0.04 | 0.04 |
| Avg Elmendorf TD | N | 7.90 | 7.52 | 7.77 | 8.04 | 7.66 | 9.31 |
| Avg Elmendorf TD/thickness | N/mm | 208 | 193 | 199 | 206 | 196 | 207 |

GLOSS at 45°

|  |  |  |  |  |  |  |  |
|---|---|---|---|---|---|---|---|
| Avg Gloss | % | 52.2 | 48.8 | 44.4 | 46 | 46 | 40.1 |

HAZE

|  |  |  |  |  |  |  |  |
|---|---|---|---|---|---|---|---|
| Avg Haze | % | 12.7 | 15.2 | 15.3 | 16.7 | 14.6 | 18.5 |

SLOW PUNCTURE

|  |  |  |  |  |  |  |  |
|---|---|---|---|---|---|---|---|
| Avg Max Force/thickness | N/mm | 1455 | 1364.7 | 1391.9 | 1393.9 | 1572.5 | 1418.3 |
| Avg Force Rupture/thickness | N/mm | 1405 | 1347.3 | 1368.3 | 1366.7 | 1539.1 | 1411.9 |
| Avg Energy/thickness | J/mm | 78 | 68.39 | 69.97 | 70.66 | 91.39 | 70.61 |

TABLE 4

Resin composition and film properties

|  |  | 780B | 780D | 8G | 8H | 127 | 129 | 128 |
|---|---|---|---|---|---|---|---|---|
| Density Higher density fraction (HDF) | g/cm³ | 0.948 | 0.944 | 0.930 | 0.929 | 0.955 | 0.955 | 0.955 |
| Weight HDF | % | 4 | 43 | 41.5 | 43.7 | 42 | 42 | 42 |
| $M_n$ HDF | kDa | 21.2 | 17.20 | 18.06 | 16.81 | 16.47 | 16.47 | 16.47 |
| $M_w$ HDF | kDa | 51.94 | 42.14 | 44.24 | 41.18 | 40.35 | 40.35 | 40.35 |
| MI2 HDF | g/10 min | 9.1 | 23.2 | 17.4 | 23.8 | 26 | 26 | 26 |
| Density Lower density fraction (LDF) | g/cm³ | 0.924 | 0.927 | 0.917 | 0.915 | 0.912 | 0.913 | 0.914 |
| $M_n$ LDF | kDa | 48.16 | 52.82 | 59.92 | 62.58 | 44.73 | 51.16 | 44.07 |
| $M_w$ LDF | kDa | 125.20 | 137.33 | 155.79 | 162.71 | 116.30 | 133.03 | 114.58 |
| $M_w$ LDF/$M_n$ HDF |  | 2.41 | 3.36 | 3.52 | 3.95 | 2.88 | 3.30 | 2.84 |
| GPC pellet | $M_n$ (kDa) | 30.8 | 27.7 | 29.6 | 28.4 | 23.9 | 24.7 | 23.4 |
|  | $M_w$ (kDa) | 93.7 | 96.4 | 109.5 | 109.6 | 84.4 | 94.1 | 83.4 |
|  | $M_z$ (kDa) | 219 | 239 | 272 | 280 | 189 | 224 | 191 |
|  | D ($M_w/M_n$) | 3.0 | 3.5 | 3.7 | 3.9 | 3.5 | 3.8 | 3.6 |
|  | D' ($M_z/M_w$) | 2.3 | 2.5 | 2.5 | 2.6 | 2.2 | 2.4 | 2.3 |
| DENSITY | g/cm³ | 0.934 | 0.934 | 0.922 | 0.921 | 0.930 | 0.930 | 0.931 |
| MI2 | g/10 min | 0.4 | 0.5 | 0.3 | 0.3 | 0.7 | 0.5 | 0.7 |
| HLMI | g/10 min | 19 | 20 | 17 | 17 | NM | NM | NM |
| $g_{rheo}$ |  | 0.30 | 0.33 | 0.40 | 0.48 | 0.62 | 0.57 | 0.67 |
| PI | $10^6$/Gc (Pa$^{-1}$) | 7.84 | 10.87 | 10.01 | 9.96 | 8.1 | 9.69 | 8.27 |

DART

|  |  | 780B | 780D | 8G | 8H | 127 | 129 | 128 |
|---|---|---|---|---|---|---|---|---|
| Dart/thickness | g/μm | 3.45 | 2.90 | 17.10 | 21.20 | 6.30 | 7.30 | 5.90 |
| Avg Elmendorf MD/thickness | N/mm | 21.40 | 12.00 | 46.80 | 50.10 | 63.70 | 54.40 | 54.10 |
| Avg Elmendorf TD/thickness | N/mm | 129.00 | 107.00 | 147.40 | 136.60 | 193.60 | 200.50 | 194.00 |

NM: Not measured

TABLE 5

|  | mPE1 monomodal: ref OK | mPE2 monomodal ref KO | 129 |
|---|---|---|---|
| d (g/cm³) | 0.933 | 0.934 | 0.932 |
| MI2 (g/10 min) | 0.2 | 1.0 | 0.5 |
| Failure time (h) | 81 | 13.4 | >433 |

TABLE 7

| Resin | Trial reference | Max Line Speed (m/min) | Pressure measured at the die (bar) | Melt fracture |
|---|---|---|---|---|
| 1203A | V1 | 67 | 128 | YES |
| 1203A | V2 | 80 | 145 | YES |
| 1203A | V3 | 100 | 166 | YES |
| 1203A |  | 120 | NM |  |

TABLE 6

| Resin | MI2 Rx1 calc g/10 min | MI2 Rx2 g/10 min | density Rx1 g/cm³ | density Rx2 calc g/cm³ | RR % | MI2 pellets g/10' | density pellets g/cm³ | GPC D/D' |
|---|---|---|---|---|---|---|---|---|
| 1203A | 0.79 | 0.81 | 0.9318 | 0.9345 | 51.8 | 0.76 | 0.9334 | 2.6/1.9 |

TABLE 7-continued

| Resin | Trial reference | Max Line Speed (m/min) | Pressure measured at the die (bar) | Melt fracture |
|---|---|---|---|---|
| 1203I | V4 | 67 | 106 | NO |
| 1203I | V5 | 80 | 116 | NO |
| 1203I | V6 | 100 | 131 | YES/NO |
| 1203I | V7 | 120 | 145 | YES |
| 1203M | V8 | 67 | 102 | NO |
| 1203M | V9 | 80 | 113 | NO |
| 1203M | V10 | 100 | 129 | YES/NO |
| 1203M |  | 120 |  | NM |

NM: Not measured

The invention claimed is:

1. A metallocene-catalyzed polyethylene resin having a multimodal molecular weight distribution, comprising:
from 45% by weight to 75% by weight of a low density fraction, said low density fraction having a density below or equal to 0.918 g/cm³ as measured following the method of standard test ISO 1183 at a temperature of 23° C.;
wherein the density of the polyethylene resin is from 0.920 to 0.945 g/cm³;
wherein the Mw/Mn of the polyethylene resin is from 2.8 to 6;
wherein the melt index $MI_2$ of the polyethylene resin is from 0.1 to 5 g/10 min as measured following the method of standard test ISO 1133 Condition D at a temperature of 190° C. and under a load of 2.16 kg;
wherein the composition distribution breadth index (CDBI) of the polyethylene resin is below 70%, as analyzed by quench TREF (temperature rising elution fractionation) analysis; and wherein the polyethylene resin comprises a bimodal composition as measured by quench TREF analysis,
wherein the polyethylene resin has a $g_{rheo}$ of less than 0.90 and greater than 0.35, wherein $g_{rheo}$ is determined according to:

$$g_{rheo}(PE) = \frac{M_w(SEC)}{M_w(\eta_0, MWD, SCB)}$$

wherein $M_w(SEC)$ is the weight average molecular weight obtained from size exclusion chromatography expressed in kDa, and wherein $M_w(\eta_0, MWD, SCB)$ is determined according to the following $M_w(\eta_0, MWD, SCB) = \exp(1.7789 + 0.199769 \ln M_n + 0.209026(\ln \eta_0) + 0.955(\ln \rho) - 0.007561(\ln M_z)(\ln \eta_0) + 0.02355(\ln M_z)^2$ wherein density ρ is measured in g/cm³ and measured according to ISO 1183 at a temperature of 23° C. and wherein zero shear viscosity $\eta_0$ in Pa·s is obtained from a frequency sweep experiment combined with a creep experiment, and taking the assumption of equivalence of angular frequency (rad/s) and shear rate, and wherein zero shear viscosity $\eta_0$ is estimated by fitting with Carreau-Yasuda flow curve (η–W) at a temperature of 190° C., obtained by oscillatory shear rheology on ARES-G2 equipment in the linear viscoelasticity domain, and wherein circular frequency (W in rad/s) varies from 0.05-0.1 rad/s to 250-500 rad/s, and the shear strain is typically 10%, and wherein the creep experiment is carried out at a temperature of 190° C. under nitrogen atmosphere with a stress level such that after 1200 s the total strain is less than 20%.

2. The metallocene-catalyzed polyethylene resin according to claim 1, wherein the Mw of the low density fraction is from 80 to 140 kDa.

3. The metallocene-catalyzed polyethylene resin according to claim 1, wherein the CDBI of the polyethylene resin is in a range of 30-50%, as analyzed by quench TREF analysis.

4. The metallocene-catalyzed polyethylene resin according to claim 1, wherein the polyethylene resin comprises a higher density fraction having a higher density than the low density fraction, wherein a ratio Mw of the low density fraction/Mw of the higher density fraction is less than 6 and greater than 2.5.

* * * * *